(12) United States Patent (10) Patent No.: US 7,765,596 B2
Longsine et al. (45) Date of Patent: Jul. 27, 2010

(54) INTRUSION HANDLING SYSTEM AND METHOD FOR A PACKET NETWORK WITH DYNAMIC NETWORK ADDRESS UTILIZATION

(75) Inventors: Gary W. Longsine, Missoula, MT (US); Alexander Brian Cone, New York, NY (US); Charles Swiger, New York, NY (US)

(73) Assignee: Intrinsic Security, Inc., Washington, DC (US)

( * ) Notice: Subject to any disclaimer, the term of this patent is extended or adjusted under 35 U.S.C. 154(b) by 1570 days.

(21) Appl. No.: 11/054,251

(22) Filed: Feb. 9, 2005

(65) Prior Publication Data

US 2006/0179485 A1 Aug. 10, 2006

(51) Int. Cl.
*H04L 29/06* (2006.01)
(52) U.S. Cl. .......................... 726/23; 713/160
(58) Field of Classification Search ................. 713/165, 713/160, 167; 726/23
See application file for complete search history.

(56) References Cited

U.S. PATENT DOCUMENTS

| 2002/0147915 | A1 | 10/2002 | Chefalas et al. |
|---|---|---|---|
| 2003/0084349 | A1 | 5/2003 | Friedrichs et al. |
| 2004/0078592 | A1 | 4/2004 | Fagone et al. |
| 2004/0083408 | A1 | 4/2004 | Spiegel et al. |
| 2004/0093514 | A1 | 5/2004 | Piazza et al. |
| 2004/0111531 | A1 | 6/2004 | Staniford et al. |
| 2004/0111636 | A1 | 6/2004 | Baffes et al. |
| 2004/0117640 | A1 | 6/2004 | Chu et al. |
| 2004/0128529 | A1 | 7/2004 | Blake et al. |
| 2004/0128543 | A1 | 7/2004 | Blake et al. |

FOREIGN PATENT DOCUMENTS

WO WO 2004/107706 12/2004

OTHER PUBLICATIONS

Droms R et al, "Authentication for DHCP Messages; rfc3118.txt", IETF Standard, Internet Engineering Task Force IETF, CH, Jun. 2001, pp. 1 and 2, XP015008899 ISSN 0000-0003.
Droms Bucknell University R, "Dynamic Host Configuration Protocol; RFC2131.TXT", IETF Standard, Internet Engineering Task Force, IETF, CH, Mar. 1997. pp. 13-17, XP015007915 ISSN 0000-003.
Spitzner, L. "Honeypots: Sticking it to Hackers Dertarring Security Breaches May Be Sticky Business, But Honeypots Can Spell Sweet Success", Network Magazine, Apr. 2003, pp. 48-51, vol. 18 No. 4, XP001162182 ISSN: 1093-8001, CMP Media, New York, NY, US.
Sutherland, Ed, Researchers Lure Wi-Fi Hackers, Aug. 26, 2002. Wi-Fi Planet [online] [retrieved on Jul. 19, 2004]. Retrieved from the Internet: <URL: http://www.wi-fiplanet.com/columns/article.php/1452411>.
Honeypot. AuditMyPc.com [online], [retrieved on Jul. 19, 2004]. Retrieved from the Internet <URL: http://www.auditmypc.com/freescan/readingroom/honeypot.asp>.

*Primary Examiner*—Thomas R Peeso
(74) *Attorney, Agent, or Firm*—The Ollila Law Group LLC

(57) ABSTRACT

An intrusion handling system for a packet network is provided according to an embodiment of the invention. The intrusion handling system includes a communication interface configured to receive or detect a network event that is directed to a network address. The intrusion handling system further includes a processing system coupled to the communication interface and configured to receive the network event from the communication interface, determine whether to yield the network address, respond to the network event in order to retain the network address, and not respond to the network event in order to yield the network address.

100 Claims, 12 Drawing Sheets

INTRUSION HANDLING SYSTEM AND METHOD FOR A PACKET NETWORK WITH DYNAMIC NETWORK ADDRESS UTILIZATION

TECHNICAL FIELD

The present invention relates to an intrusion handling system and method for a packet network, and more particularly, to an intrusion handling system and method for a packet network with dynamic network address utilization.

BACKGROUND OF THE INVENTION

Electronic networks, such as computer networks, are widely used for communications, data sharing, data storage, applications sharing, data processing, etc. The increased availability and power of common computer devices has lead to a widespread increase in interconnected networks, wherein computer devices communicate and share data between widely distributed networks. As a result, computer networks have become ubiquitous. One popular and widespread computer network is the Internet, which comprises multiple, interconnected computer networks.

A problem that has grown along with the growth of computer networks has been the surge in unauthorized or malicious access to computer systems. Such unauthorized or malicious access has been made possible by computer networks, wherein anonymous persons (or automated programs) can gain access to computer systems and cause damage to data, access to other systems, etc. One growing problem is where an intruder attempts to connect to many addresses over a computer network in order to establish a connection to a computer system using a network address. The completed connection can be used to access the corresponding computer system, and even to access other computer systems in communication with the compromised computer system.

An access attempt is commonly in the form of an acknowledgement request sent by the intruder. A subsequent response from the network address is a signal that the address is being used, while a lack of response from any network device is interpreted as a signal that the network address is unused and is available for use. This is commonly termed "scanning," wherein an external computer device is programmed to systematically scan network addresses seeking systems that can be exploited directly and/or be used to gain access to corresponding computer devices and/or corresponding computer networks.

A prior art approach to detecting and preventing this form of unauthorized access has been the development and deployment of systems commonly referred to as tarpits, honeypots, or sticky honeypots. In the prior art approach, the unused network addresses of a network are monitored by a security system or security routine. The security system or routine is programmed to recognize the unused network addresses, and treats any attempts to access these network addresses as unauthorized access attempts. An access attempt is commonly initiated by an acknowledgement request, wherein a response from an address indicates that a host is present at that address and may be vulnerable to attack. When no response is received from an address, the agent performing the unauthorized access attempt knows immediately that the address is not used, and continues to probe or scan other addresses.

In addition to the prior art security system or routine detecting an unauthorized access attempt, the prior art security system or routine can hold the connection, and can make the scanning computer waste time waiting for an expected response. This is where the term tarpit, honeypot, and sticky honeypot come into play. When a scanning computer identifies a host and subsequently attempts to exchange messages with the host at a given network address, the prior art security system or routine can issue a "busy," "wait," or "retry" response. The scanning computer will therefore wait for a "non-busy" or "ready" message, or wait until a timeout period elapses. This can typically cause the scanning computer to wait for a period of time from a few minutes to indefinitely, depending on various factors which include the inherent capabilities of the particular implementations of the network systems by different vendors, such as different timeout periods. The scanning computer will then issue another acknowledgement request. If the security system or routine continues to reply with "busy," "wait," or "retry" responses, the security system or routine can keep the scanning computer waiting and relatively inactive for long periods of time.

The processing time required for the security system or routine to perform this trapping action is minimal, while the real elapsed time imposed on the scanning computer is much larger than it would otherwise be, which slows the rate of the scanning. In addition, the scanning computer typically is halted from scanning for other computer systems on the network. Therefore, if a computer device of a business entity or institution is scanned and the scan is trapped and held as described, the sticky honeypot may prevent other unused network addresses or other computer devices of the business entity or institution from being scanned. In addition, the trapping may be invaluable for preventing further intrusion and even limiting damage from an intrusion merely by delaying the scanning process.

A dynamic network address allocation service of some type is typically employed in a computer network. For example, the dynamic network address allocation service can comprise a Dynamic Host Configuration Protocol (DHCP) server. The dynamic address allocation service facilitates management of the network and enables, through ensuring proper configuration of the network, the communications between internal network computer devices and between internal and external computer devices. When a computer device is added to the network, the computer device will contact the DHCP server and the DHCP server will assign an unused network address to the requesting computer device. The address allocation system attempts to make sure that each computer device has a unique address for use on the network. When a computer device is added to a network, the computer device will contact the DHCP server and the DHCP server will provide a network address to the new device. The computer device may request a particular address from the DHCP server. The requesting device can "lease" the address, wherein the requesting device can use the address for a specified period of time and then must stop using the address or must re-request the network address. If the assigned network address is unused for a time period, the DHCP server may de-allocate the network address and return it to a common pool. Therefore, in a modern computer network, the network address assignment is relatively dynamic, wherein network addresses can be repeatedly allocated and de-allocated over time, and may be used by different devices on the network at different times.

The prior art intrusion detection and prevention approach has drawbacks. The prior art approach is typically inflexible and does not react well to allocations and de-allocations of network addresses, particularly when this process is managed by an address allocation service like DHCP. A prior art honeypot or tarpit is not designed to dynamically acquire or release individual network addresses on a network where address allocation is managed by a service like DHCP. A prior art approach will typically use all of the network addresses that are unused at the time the prior art honeypot or tarpit is started up. The prior art approach is not designed to dynamically yield an address to an allocation server, such as a DHCP server. Consequently, one drawback in the prior art approach is that all available network addresses become used by the tarpit or sticky honeypot during operation, and therefore cause interference with the correct operation of the network as new devices are added to the network. Another drawback is that the prior art approach may not yield up unused network addresses when a dynamic address allocation service seeks to assign them to a new system on the network. This can cause severe disruption on the network under normal operation conditions, and makes these devices inappropriate for deployment on production networks. Typically, the prior art security devices are deployed in networks dedicated to hosting the honeypot, which limits their effectiveness for trapping modern types of network intrusions.

SUMMARY OF THE INVENTION

An intrusion handling system for a packet network is provided according to an embodiment of the invention. The intrusion handling system comprises a communication interface configured to receive or detect a network event that is directed to a network address. The intrusion handling system further comprises a processing system coupled to the communication interface and configured to receive the network event from the communication interface, determine whether to yield the network address, respond to the network event in order to retain the network address, and not respond to the network event in order to yield the network address.

An intrusion handling system for a packet network is provided according to an embodiment of the invention. The intrusion handling system comprises a Dynamic Host Configuration Protocol (DHCP) server, a communication interface in the DHCP server, with the communication interface configured to receive or detect a network event that is directed to a network address, and a processing system in the DHCP server. The processing system is configured to receive the network event from the communication interface, determine whether the network address is being used by the intrusion handling system for intrusion handling, yield the network address to the network address allocation service if the network address is not being used by the intrusion handling system for intrusion handling, and retain the network address if the address is being used by the intrusion handling system for intrusion handling.

An intrusion handling system for a packet network is provided according to an embodiment of the invention. The intrusion handling system comprises a communication interface configured to receive or detect a network event that is directed to a network address. The intrusion handling system further comprises a processing system coupled to the communication interface and configured to obtain a listing of one or more unused network addresses, employ at least a portion of the listing of one or more unused network addresses for intrusion handling operations in the intrusion handling system, and dynamically yield the network address from the intrusion handling system in response to the network event.

A method of managing network address utilization in an intrusion handling system for a packet network is provided according to an embodiment of the invention. The method comprises receiving or detecting a network event that is directed to a network address, and determining whether to yield the network address. The method further comprises responding to the network event in order to retain the network address and not responding to the network event in order to yield the network address.

A method of managing network address utilization in an intrusion handling system for a packet network is provided according to an embodiment of the invention. The method comprises receiving or detecting a network event that is directed to a network address, and determining whether the network address is being used by the intrusion handling system for intrusion handling. The method further comprises yielding the network address to the network address allocation service if the network address is not being used by the intrusion handling system for intrusion handling and retaining the network address if the address is being used by the intrusion handling system for intrusion handling.

A method of managing network address utilization in an intrusion handling system for a packet network is provided according to an embodiment of the invention. The method comprises receiving or detecting a network event that is directed to a network address, and determining whether the network address is being used by the intrusion handling system for trapping an intrusion occurrence. The method further comprises not responding to the network event if the network address is not being used by the intrusion handling system for trapping an intrusion occurrence or if the address yield rule set indicates that the network address should be yielded. The method further comprises responding to the network event if the network address is being used by the intrusion handling system for trapping an intrusion occurrence and if the address yield rule set indicates that the network address should not be yielded.

A method of managing network address utilization in an intrusion handling system for a packet network is provided according to an embodiment of the invention. The method comprises obtaining a listing of one or more unused network addresses, employing at least a portion of the listing of one or more unused network addresses for intrusion handling operations in the intrusion handling system, and dynamically yielding a requested network address from the intrusion handling system when a network event that is directed the requested network address is received or detected.

A method of managing network address utilization in an intrusion handling system for a packet network is provided according to an embodiment of the invention. The method comprises requesting a network address of the one or more unused network addresses, receiving a request response, employing the network address in the intrusion handling system if the request response signals that the network address can be used by the intrusion handling system, and not employing the network address in the intrusion handling system if the request response signals that the network address cannot be used by the intrusion handling system.

BRIEF DESCRIPTION OF THE DRAWINGS

The same reference number represents the same element on all drawings.

DETAILED DESCRIPTION OF THE INVENTION

FIGS. 1-12 and the following descriptions depict specific embodiments to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will also appreciate that the features described below can be combined in various ways to form multiple variations of the invention. As a result, the invention is not limited to the specific embodiments described below, but only by the claims and their equivalents.

Figure 1:
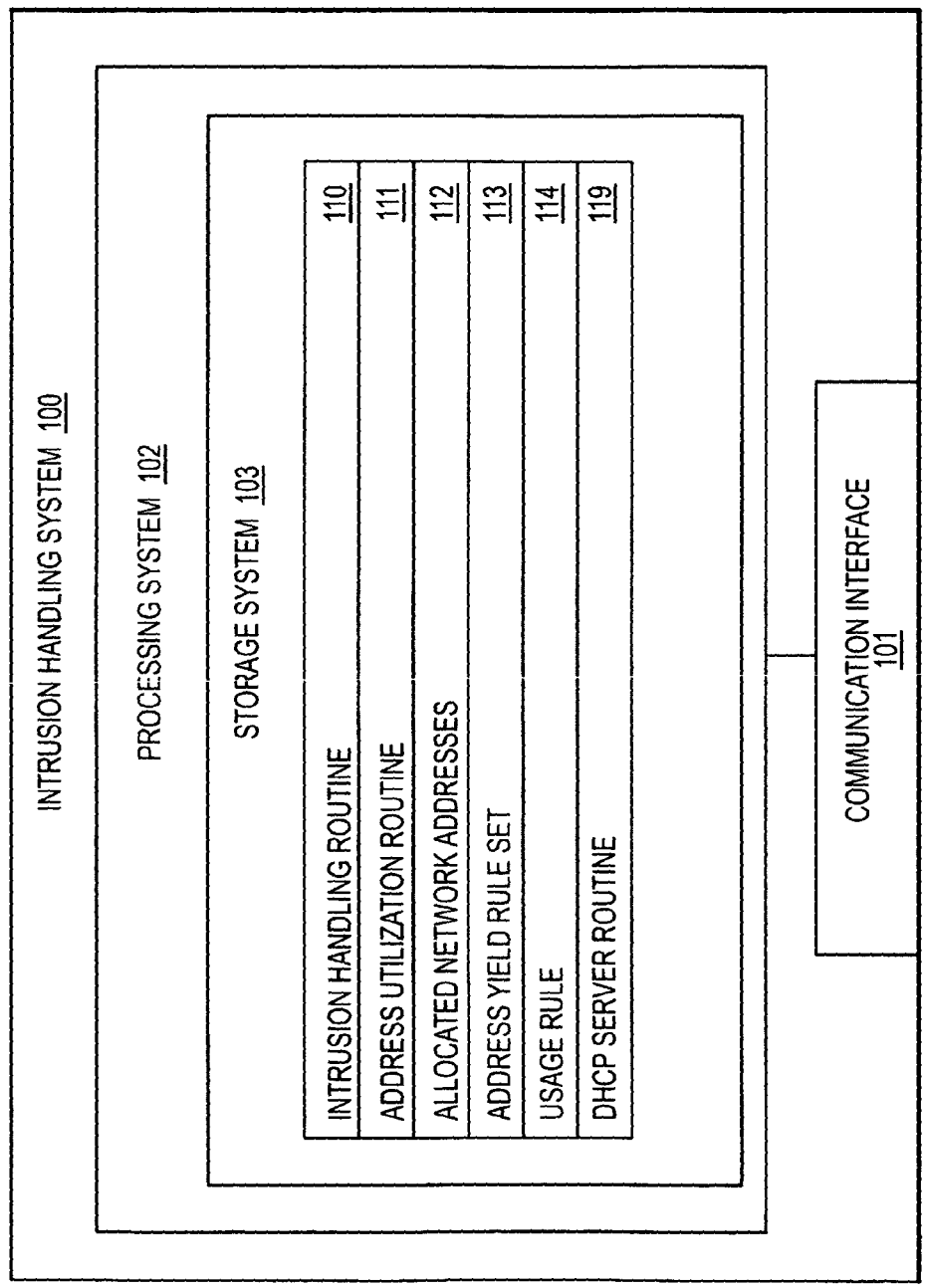
FIG. 1 shows an intrusion handling system for a packet network according to an embodiment of the invention.

FIG. 1 shows an intrusion handling system 100 for a packet network according to an embodiment of the invention. The intrusion handling system 100 comprises a communication interface 101 and a processing system 102 coupled to the communication interface 101. The communication interface 101 is configured to receive or detect a network event that is directed to a network address. The processing system 102 is coupled to the communication interface 101 and is configured to receive the network event from the communication interface 101, determine whether to yield the network address, respond to the network event in order to retain the network address, and not respond to the network event in order to yield the network address. In addition, the processing system 102 can be configured to obtain a listing of one or more unused network addresses, employ at least a portion of the listing of one or more unused network addresses for intrusion handling operations in the intrusion handling system 100, and dynamically yield the network address from the intrusion handling system 100 in response to the network event.

In one embodiment, the intrusion handling system 100 is configured to detect an intrusion. In one embodiment, the intrusion handling system 100 is configured to trap an intrusion. In addition, the intrusion handling system 100 can perform more than one of the detecting, trapping, and tracing. In one embodiment, the intrusion handling system 100 is configured to trace an intrusion. The intrusion handling system 100 is configured to handle intrusions into an associated network (see FIG. 2). The associated network can comprise any data network or communication network, such as a packet network 130 where communications are in the form of packets of digital data.

When the intrusion handling system 100 detects an unauthorized access attempt, the intrusion handling system 100 can operate to trap the connection, and can make the scanning computer waste time waiting for an expected response. When a scanning computer requests an acknowledgement from an unused network address, the intrusion handling system 100 can issue a "busy," "wait," or "retry" response for the unused network address. The scanning computer will therefore wait for an appropriate "non-busy" or "ready" message. The "busy," "wait," or "retry" response can typically cause the scanning computer to wait for minutes or even indefinitely. The delay can vary, depending on such factors as the inherent capabilities of the particular networking technology, the particular implementations of the network systems by different vendors, on the characteristics and configurations of the scanner device itself, etc. The scanning computer will likely issue another acknowledgement request. If the intrusion handling system 100 continues to reply with "busy," "wait," or "retry" responses, the intrusion handling system 100 can keep the scanning computer waiting and relatively inactive for long periods of time.

The processing time required for the intrusion handling system 100 to perform this trapping action is minimal, yet a significant delay in scanning progress can be imposed on the scanning computer. In addition, the scanning computer can be tied up and prevented from scanning for other network devices. Therefore, if a computer device of a business entity or institution is scanned and the scan is trapped, the intrusion handling system 100 may prevent other computer devices of the business entity or institution from being scanned. In addition, the trapping may be invaluable for preventing further intrusion and even tracking down the intruder merely by delaying the scanning process.

In one embodiment, the intrusion handling system 100 comprises a stand-alone network device. For example, the intrusion handling system 100 can comprise an intrusion handling computer that is connected to the packet network 130. Alternatively, in another embodiment the intrusion handling system 100 is integrated into a network component. For example, the intrusion handling system 100 can be integrated into the network address allocation system 140, such as a DHCP server. In another example, the intrusion handling system 100 can be integrated into other network devices, such as a router, a switch, etc. Other configurations of the intrusion handling system 100 are contemplated and are within the scope of the description and claims.

Figure 2:
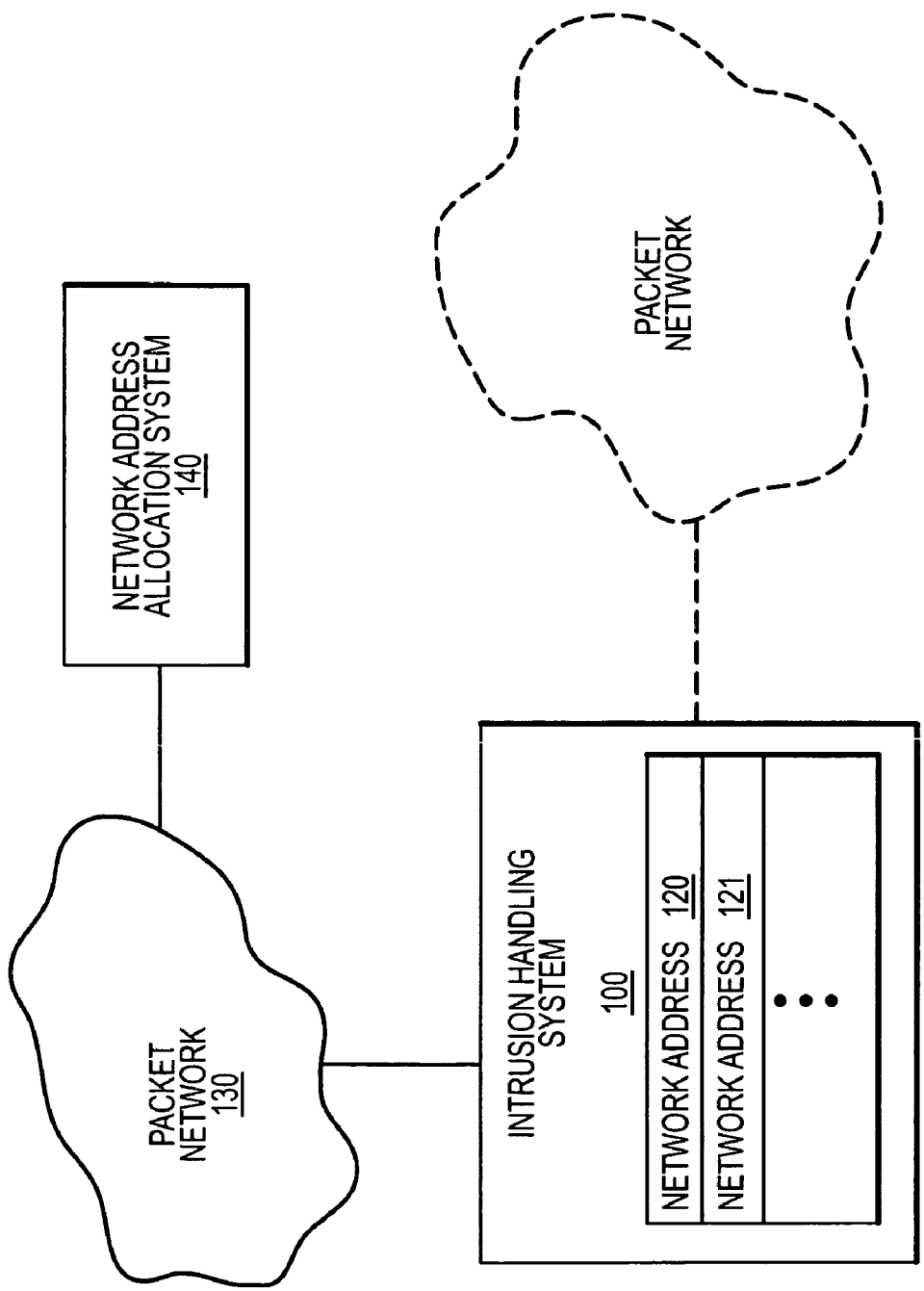
FIG. 2 shows a network environment that includes the intrusion handling system according to an embodiment of the invention.

In one embodiment, the intrusion handling system 100 is configured to autonomously acquire and yield network addresses without the assistance or knowledge of a network address allocation system 140 (see FIG. 2). In this embodiment, the intrusion handling system 100 listens in on network traffic and autonomously determines whether to retain or yield a network address. The intrusion handling system 100 assumes and uses an unused network address unless and until a device on the network tries to obtain the network address (see FIGS. 5-7). In this mode of operation, the intrusion handling system 100 functions on a network with or without a network address allocation system 140, without interfering with the correct operation of the packet network 130 and the network address allocation system 140, if present.

In another embodiment, the intrusion handling system 100 is configured to cooperate and directly communicate with the network address allocation system 140 in order to dynamically receive and yield network addresses. In this embodiment, the intrusion handling system 100 requests a network address from the network address allocation system 140. The intrusion handling system 100 only uses the requested network address after the network address is allocated to the intrusion handling system 100 by the network address allocation system 140 (see FIGS. 8-9).

The communication can be performed using one or more network protocols appropriate to a given network address allocation service and network. For example, in one embodiment the network address allocation system 140 can operate according to a DHCP service and can comprise a DHCP server on a TCP/IP network; wherein a communication message can comprise a Dynamic Host Configuration Protocol (DHCP) message. In other embodiments, the network address allocation system 140 can comprise a Bootstrap Protocol (BOOTP) service, a Remote Access Service (RAS), a Point-to-Point Protocol over Ethernet (PPPOE) service, a Multicast Address Dynamic Client Allocation Protocol (MADCAP) service, an Internet Control Message Protocol (ICMP) message, or a DHCP service wherein the address is a Packet Data Protocol (PDP) address on a General Packet Radio Service (GPRS) wireless network. Other network address allocation systems are contemplated and are within the scope of the description and claims. The intrusion handling system 100 can also employ other protocols, such as the Address Resolution Protocol (ARP), in order to discover information about the packet network 130. An ARP request on a TCP/IP network can be used to obtain a physical address from a logical address. The intrusion handling system 100 uses the obtained information in order to help determine the appropriate response to an ICMP or DHCP message. It should be understood that other communication protocols (or other address handling protocols) can be employed, and are within the scope of the description and claims.

The communication interface 101 conducts communications with one or more packet networks, such as a computer network. The communication interface 101 receives or detects a network event from the network address allocation system 140. The network event can be directed to a network address that is being requested by the network address allocation system 140 and that is being used by the intrusion handling system 100. The communication interface 101 can pass the network event to the processing system 102 and can transmit a reply from the processing system 102 to the requesting device.

The processing system 102 conducts operations of the intrusion handling system 100, performs intrusion handling operations, and retains or yields network addresses for use in the intrusion handling operations. The processing system 102 can comprise a general purpose computer, a microprocessing system, a logic circuit, or some other general purpose or customized processing device. The processing system 102 can be distributed among multiple processing devices.

The processing system 102 can include any manner of integral or independent electronic storage medium, such as the storage system 103. In one embodiment, the storage system 103 stores an intrusion handling routine 110, an address utilization routine 111, a listing of allocated network addresses 112, an address yield rule set 113, a usage rule 114, and an optional DHCP server routine 119.

The processing system 102 receives network events and processes the network events in order to determine whether to retain or yield a requested network address. The processing system 102 can execute the intrusion handling routine 110 in order to determine whether to retain or yield the requested network address. In addition, the processing system 102 can execute the address utilization routine 111 in order to implement the determination and in order to retain or yield the requested network address.

A network event comprises an event that includes or initiates network address allocation activity, and can include a request or signal that causes a network device to respond if that network device is using an included network address. In effect, the request message or address signal can be a request to acknowledge usage of a network address. In one embodiment, the network event comprises an Internet Control Message Protocol (ICMP) Echo Request message. In one embodiment the network event comprises a ping message. It should be understood that other request messages, signals, protocols, etc. are contemplated and are within the scope of the description and claims.

The intrusion handling routine 110 is configured to detect an intrusion and perform one or more of a detecting, trapping, and tracing operations on the intrusion. The intrusion handling routine 110 can detect an intrusion attempt, such as a worm scanning for vulnerable systems on the network, by detecting an arbitrary incoming message directed at one of the otherwise-unused addresses which the intrusion handling system 100 has adopted for its own use. As previously discussed, the trapping can comprise responding to a network address request with a "busy," "wait," or "retry" message, wherein the intruding computer device is made to wait for a "ready" message for the requested network address, or by responding with a "ready" message and ignoring subsequent messages for a time. The intruding computer device can repeatedly attempt to engage in a conversation with the intrusion handling system 100 and will repeatedly receive the "busy," "wait," or "retry" message response (or no response, as appropriate) to encourage the intruder to waste its scanning resources.

The intrusion handling routine 110 performs intrusion handling operations, in part by making use of otherwise unused network addresses on a given network. The intrusion handling routine 110 can independently perform actions on various network addresses. For example, the intrusion handling routine 110 can be disabled for a particular network address when it determines it should yield the address, such as when a new system seeks to join the network or upon the occurrence of a dynamic address allocation request from a DHCP server, for example. Any address request or address usage allocation by the network address allocation system 140 which concerns network addresses which the intrusion handling system 110 has obtained for its own use will be observed or directly received by the intrusion handling system 100 and in some scenarios will cause the intrusion handling system 100 to yield the requested network address. The intrusion handling routine 110 cooperates with the address utilization routine 111 (discussed below) in order to acquire or yield a network address.

The address utilization routine 111 identifies unused network addresses that can be used by the intrusion handling system 100. The address utilization routine 111 can obtain at least a portion of unused network addresses on a given network. In addition, the address utilization routine 111 ceases to use the network addresses and yields the network addresses to a network address allocation system 140 when the network address is requested by the network address allocation system 140 (such as a DHCP server, for example).

The address utilization routine 111 in one embodiment yields the requested network address by not responding to a network event from the network address allocation system 140. The network event in one embodiment comprises an Internet Control Message Protocol (ICMP) Echo Request directed to the requested network address. The Echo Request requests that the receiver reply to the echo request, with the reply indicating that the requested network address is being used by the replying network device. In one embodiment, the network event comprises a Packet InterNet Groper message (i.e., a ping message). The network event is also observed by the address utilization routine 111. However, other network event are contemplated and are within the scope of the description and claims.

In one embodiment, the address utilization routine 111 will yield a requested network address if the requested network address is not currently trapping an intrusion. Alternatively, if the requested network address is currently being used to trap an intrusion, the address utilization routine 111 can deny the request and retain the network address, such as by responding to the message, indicating that the address is in use, for example. The network address manager is thereby notified that the requested network address will not be yielded by the intrusion handling system 100.

In one embodiment, the address utilization routine 111 can retain the requested network address if the requested network address is currently allocated to or being held by the intrusion handling system 100. The requested network address can be retained even if the requested network address is not currently detecting or trapping an intrusion attempt.

In one embodiment, even if the intrusion handling system 100 is currently trapping an intrusion occurrence on the requested network address, the address will not be yielded unless the address yield rule set 113 indicates that the network address should be yielded by the intrusion handling system 100. Therefore, in all of the above embodiments, the address utilization routine 111 can further consult the address yield rule set 113 (see below) and make a retain or yield determination based on the above factors together with the address yield rules.

The address yield rule set 113 comprises one or more decision rules that the address utilization routine 111 uses in order to decide whether to keep or yield the requested network address. The address yield rule set 113 can include any desired decision rules, decision criteria, or decision information. In one embodiment, the address yield rule set 113 comprises a trapping rule that specifies that the requested network address is not yielded if the requested network address is currently being used to trap or otherwise handle an intrusion. However, other or additional decision rules can also be employed. For example, the decision rules can also take into account the current level of address usage and the need for the requested network address, a priority of a request, can make a yield decision based on the message type of the network address request, can make a yield decision based on the address of the originator of the network address request, etc. Other decision rules are contemplated and are within the scope of the description and claims.

In one embodiment, the address yield rule set 113 can include a rule that prefers predetermined addresses for intrusion handling. For example, worms often scan serially through logical addresses, starting at the bottom or the top of an address space. Consequently, the intrusion handling system 100 can be configured to always try to obtain a predetermined number of top and bottom addresses. In addition, the intrusion handling system 100 can be configured wherein the top and bottom addresses be the last to be yielded, or not at all.

The usage rule 114 comprises one or more usage parameters or conditions that specify how many of the unused network addresses can be used by the intrusion handling system 100. For example, the usage rule 114 can specify the use of a predetermined percentage of unused network addresses. Less than all of the unused network addresses can be employed in order to minimize the effect on network communications by the intrusion handling system 100. In addition, the usage rule 114 can take into account various other factors, such as the number of devices on the network, current traffic conditions, current threats, etc.

Figure 10:
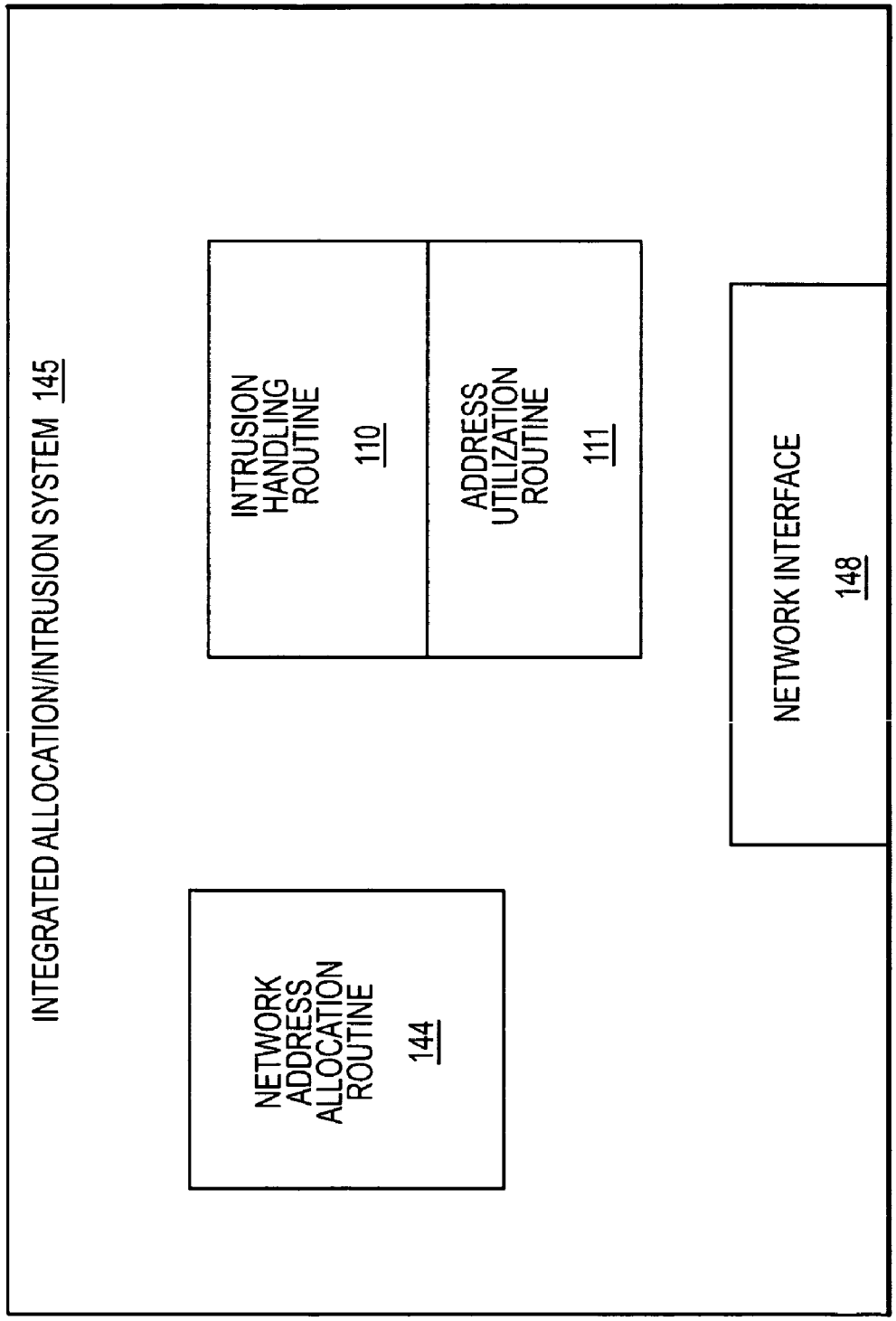
FIG. 10 is a diagram of an integrated allocation/intrusion system according to an embodiment of the invention.

In one embodiment, the intrusion handling system 100 is integrated into a DHCP server (see also FIG. 10 and the accompanying text). In this embodiment, the DHCP/intrusion handling system 100 comprises a DHCP server routine 119, an intrusion handling routine 110, a communication interface 101, and a processing system 102. The communication interface 101 is configured to receive or detect a network event, with the network event being directed to a network address. The processing system 102 is configured to execute the DHCP server routine 119 and the intrusion handling routine 110. The processing system 102 is configured to receive the network event from the communication interface 101, determine whether the network address is being used by the DHCP/intrusion handling system 100 for intrusion handling, yield the network address to the network address allocation service 140 if the network address is not being used by the DHCP/intrusion handling system 100 for intrusion handling, and retain the network address if the address is being used by the DHCP/intrusion handling system 100 for intrusion handling. In addition, the DHCP/intrusion handling system 100 can perform any additional operations/actions discussed in regard to any embodiments of the invention.

FIG. 2 shows a network environment 200 that includes the intrusion handling system 100 according to an embodiment of the invention. The network environment 200 can also include a packet network 130 and a network address allocation system 140. As previously discussed, the intrusion handling system 100 can be in communication with the packet network 130 in order to perform intrusion handling operations for the network. Therefore, the intrusion handling system 100 can obtain one or more network addresses, such as the network addresses 120 and 121 (shown) and can perform intrusion handling operations using the obtained network addresses. For example, the intrusion handling system 100 can use the obtained network addresses for detecting, trapping, and tracing intrusion attempts.

The packet network 130 can comprise any manner of packet network. The packet network 130 can comprise any manner of wire or wireless network. The packet network 130 can comprise a Local Area Network (LAN), or can comprise a component of a LAN. For example, the packet network 130 can comprise a network used in a business, school, office, or other institution. The packet network 130 can comprise a network of wireless cellular phones or other devices, or it can comprise a geographically distributed network, such as a cable modem or DSL network maintained by an Internet Service Provider. Because the packet network 130 is commonly connected to the outside world (such as other institutional networks or to the Internet, for example), the packet network 130 is exposed to intrusion and attack. Even networks which are isolated or protected by perimeter defenses (such as by a firewall, for example), may be vulnerable to attack from a variety of sources. A simplest source of attack can be the connection of a device to the protected network, wherein the device was previously compromised from having been connected to a hostile network, for example.

As packet networks have grown, address allocation has become increasingly dynamic in nature, wherein devices are added and removed from networks frequently, and the addresses they use to communicate on the network are allocated and de-allocated on an as-needed basis. This has presented a difficulty in the prior art for effective and continuing intrusion trapping. Prior art intrusion trapping has not been aware of dynamic address allocation. Therefore, the prior art has the drawbacks of either performing trapping on too few addresses and not trapping as effectively as could be possible, or trapping on too many addresses and interfering with communications on the packet network 130.

It is increasingly common for a packet network 130 to include a network address allocation system 140 that controls and allocates some or all network addresses. Therefore, the intrusion handling system 100 can perform intrusion handling on networks with dynamically assigned network addresses. The network address allocation server 140 for a given packet network 130 may in some cases reside on a different connected network.

The network address allocation system 140 comprises a device that coordinates and assigns network address use on the packet network 130. The network address allocation system 140 dynamically assigns network addresses. The network address allocation system 140 therefore comprises a centralized device that prevents conflicting address use. In addition, in scenarios where the packet network 130 is connected to and/or communicates with other networks, the network address allocation system 140 can also function to coordinate and assign network addresses for inter-network communications. Typically, a device that connects to the packet network 130 will request a network address from the network address allocation system 140 and use the received network address for network communications. For example, a computer device on the packet network 130 may require a valid network address in order to retrieve a file from a storage system, send a print job to a network printer, etc.

In one embodiment, the intrusion handling system 100 is configured to perform address leasing. In address leasing, the intrusion handling system 100 requests a network address from the network address allocation system 140. The network address allocation system 140 leases the requested network address to the intrusion handling system 100 for a specified period of time. Both the intrusion handling system 100 and the network address allocation system 140 treat the requested network address as the address of the intrusion handling system 100 for the specified period of time. After the time period expires, the intrusion handling system 100 stops using the network address and both systems treat the network address as reverting back to the control of the network address allocation system 140. If the intrusion handling system 100 still needs the network address, it can re-request it for an additional time period.

In one embodiment, the intrusion handling system 100 can include multiple ports. As a result, the intrusion handling system 100 can be connected to and interacting with more than one packet network (see dashed lines). This is advantageous in institutional environments that have multiple networks. For example, a computer device can be loaded with software to implement the computer device as the intrusion handling system 100. The computer device can interact with multiple packet networks in order to perform all manner of intrusion handling operations.

Figure 3:
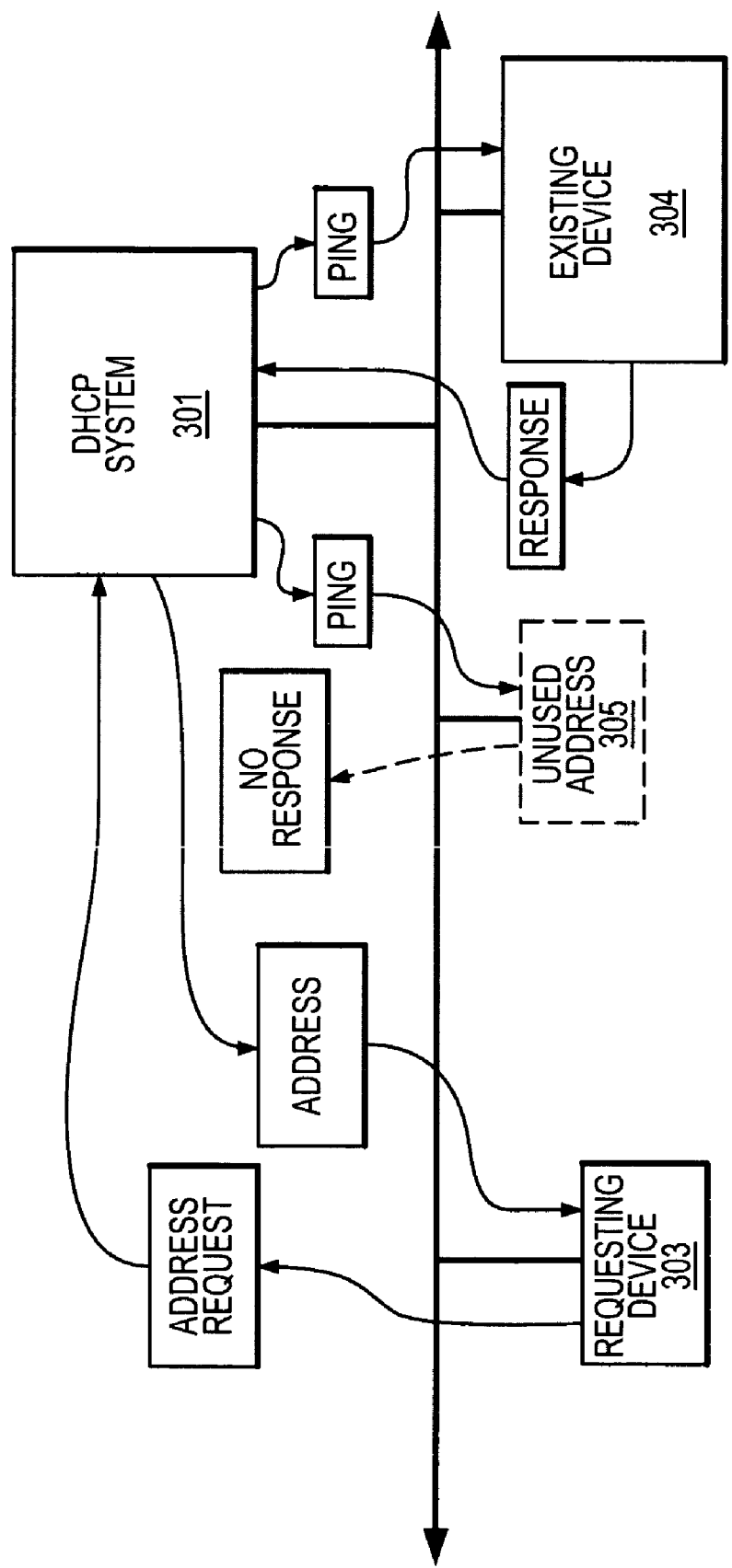
FIG. 3 shows a typical packet network that includes a DHCP system, wherein the DHCP system manages address utilization.

FIG. 3 shows a typical packet network 130 that includes an address allocation system, in this case, a DHCP system 301, wherein the DHCP system 301 manages address utilization. An address utilization process is initiated when a requesting device 303 requests an address allocation from the DHCP system 301. As a result, the DHCP system 301 tries to find an unused address that the requesting device 303 can utilize. The DHCP system 301 in this example first pings an address which happens to be in use by the existing device 304. The existing device 304 responds to the ping message, thereby indicating its use of the requested address. The DHCP system 301 therefore tries another address, and pings the unused address 305. As can be seen from the figure, no response is received for this ping message. Subsequently, the DHCP system 301 can signal the requesting device 303 with the unused address 305.

Figure 4:
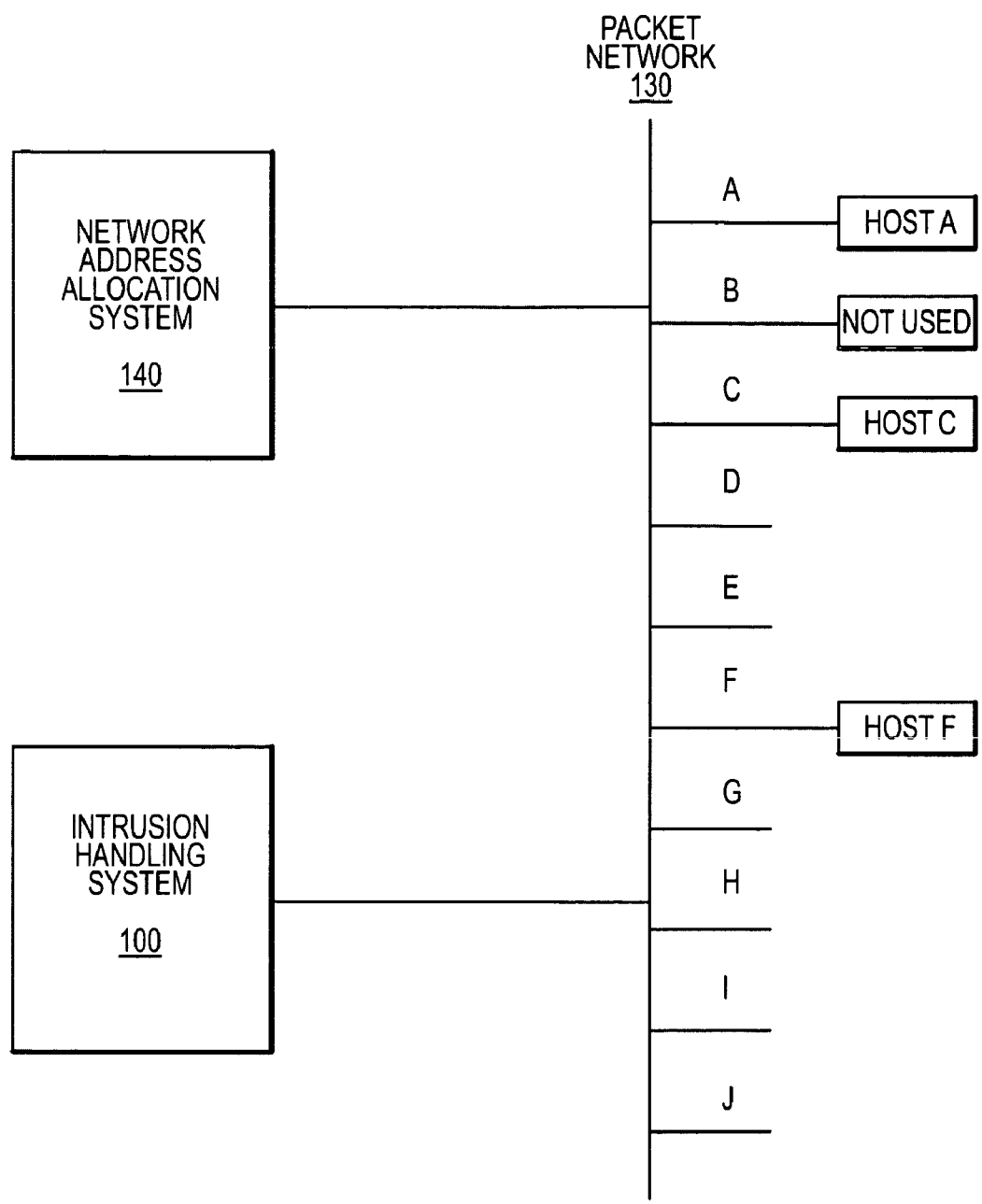
FIG. 4 shows a network environment according to an embodiment of the invention.

FIG. 4 shows a network environment 400 according to an embodiment of the invention. The intrusion handling system 100 can operate in the network environment 400 in several modes, including a passive mode, an interactive mode, and an integrated mode.

In the passive mode, the intrusion handling system 100 does not communicate directly with the network address allocation system 140. Instead, the intrusion handling system 100 yields a requested address when some other network device, such as the network address allocation system 140, for example, generates a network event that requests acknowledgement if another device is using the address. Alternatively, another device on the packet network 130 can generate the network event. In this mode, the intrusion handling system 100 detects the presence of the network address allocation system 140 and may initially identify the network address allocation system 140. The intrusion handling system 100 may also listen to address allocation traffic or other traffic on the packet network 130, or use other protocols such as the ARP protocol on a TCP/IP network, to determine the current address assignments on the network. Therefore, the intrusion handling system 100 can discover that logical address B is not being used. Subsequently, the intrusion handling system 100 confiscates and uses address B without the knowledge of the network address allocation system 140 or without explicit allocation of address B to the intrusion handling system 100. In the example shown in the figure, the addresses B, D, E, G, H, I, and J are currently unused and can be confiscated by the intrusion handling system 100. As previously discussed, the intrusion handling system 100 can use logical address B until it elects to yield the address upon receiving a network event for address B (in order to determine if any device is using address B) from a network address allocation service 140. The intrusion handling system 100 in this mode can reply to the network event in order to retain address B or can ignore the network event in order to yield address B. As previously discussed, the intrusion handling system 100 can consult an address yield rule set in order to determine whether to yield or retain a network address.

When another device on the packet network needs an address, it can request an address from the network address allocation system 140. The network address allocation system 140 can choose a network address to allocate to the requesting device. Assuming that the network address allocation system 140 picks address B in this example, then the network address allocation system 140 would generate a network event for address B in order to see if any device is using address B. Here, if the intrusion handling system 100 does not respond to the network event, then the network address allocation system 140 could go ahead and allocate address B to the requesting device and the intrusion handling system 100 would cease using address B for intrusion handling operations. If the intrusion handling system 100 responds to the network event, then the network address allocation system 140 would try another network address. The intrusion handling system 100 in the passive mode thus allows the network address allocation service 140 to function normally, even though the service is unaware of the presence of the intrusion handling system 100 on the packet network 130. The intrusion handling system 100 responds intelligently to network activity to avoid confiscation of all available network addresses.

In the interactive mode, the intrusion handling system 100 communicates directly with the network address allocation system 140 in order to obtain network addresses. Again, a first operation step of the intrusion handling system 100 therefore is to identify the network address allocation system 140. The intrusion handling system 100 requests address B (or multiple addresses) from the network address allocation system 140. If the intrusion handling system 100 is subsequently permitted to use address B, then the intrusion handling system 100 commences using the permitted addresses for intrusion handling operations. The intrusion handling system 100 acts as a client of the network address allocation system 140. The intrusion handling system 100 requests permission from the network address allocation system 140 to use network addresses, and refreshes those requests as appropriate for the given service and network. Once a network address is allocated (or leased) to the intrusion handling system 100, the intrusion handling system 100 can perform yield/retain decisions as previously discussed. When the network address allocation system 140 subsequently generates a network event that is directed to address B, then the intrusion handling system 100 again can keep or yield the address by either responding or ignoring the network event, as previously described.

In the integrated mode (see FIG. 10 and the accompanying discussion), the intrusion handling system 100 is part of the network address allocation system 140 and the network address allocation system 140 directly allocates all address requests. The network address allocation system 140 generates network events and therefore determines unused addresses. Therefore, when a device requests a network address, the network address allocation system 140 can determine if the address allocation can be accomplished without de-allocating an address currently being used for intrusion handling. If an address must be de-allocated from an intrusion handling purpose, then the network address allocation system 140 can prompt the integrated intrusion handling system 100 to de-allocate the intrusion handling usage in order to allocate the address to a requesting device. Therefore, in this mode, the network address allocation system 140 cooperates with the intrusion handling system 100 in order to determine the appropriate use of addresses.

In one embodiment, predetermined classes of systems can be given preferential access to scarce network addresses during a worm outbreak, for example. In one embodiment, predetermined classes of systems can have their network addresses temporarily revoked and re-assigned to the intrusion handling system 100 during an outbreak.

Figure 5:
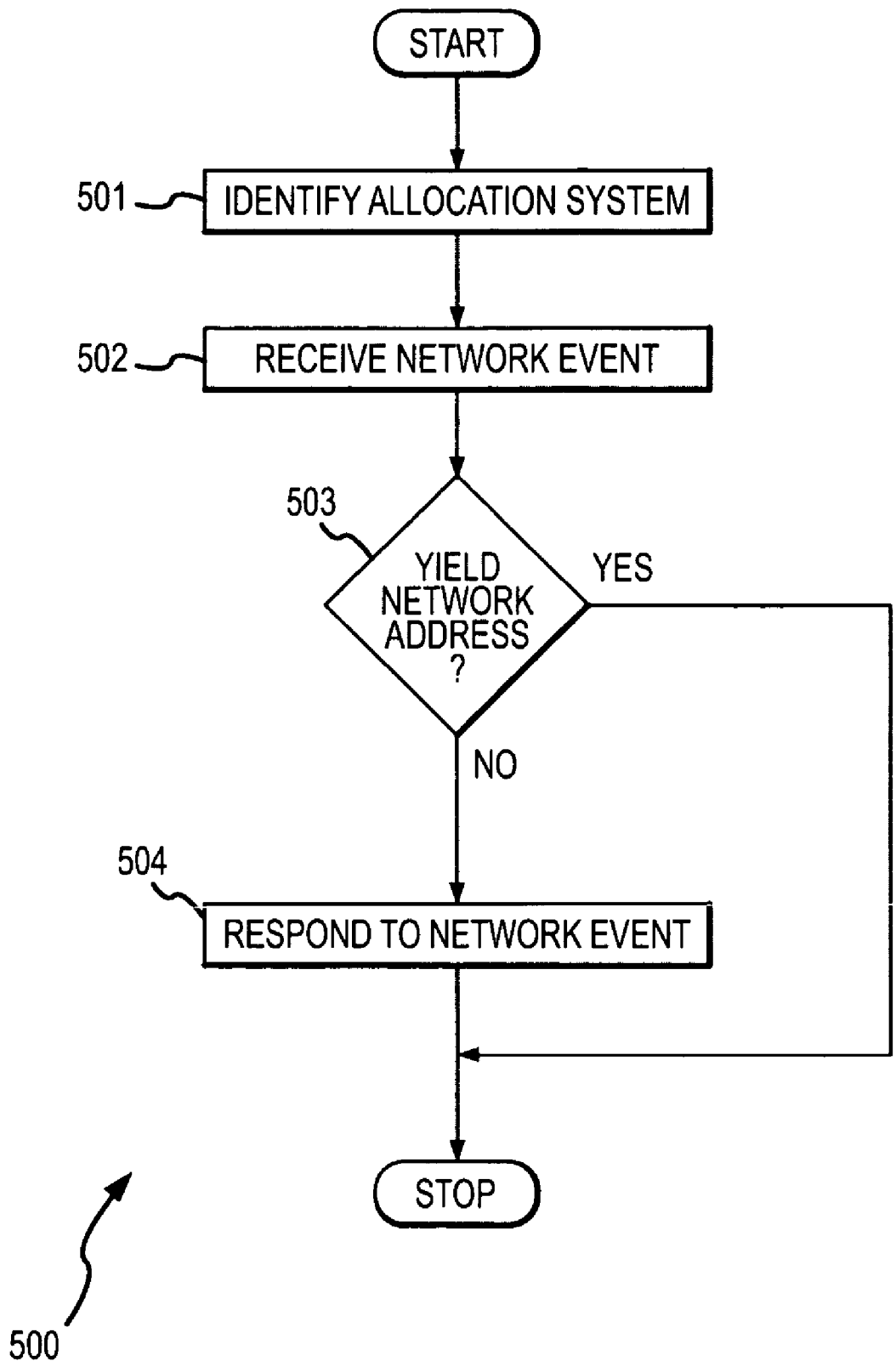
FIG. 5 is a flowchart of a method of managing network address utilization in an intrusion handling system according to an embodiment of the invention.
Figure 6:
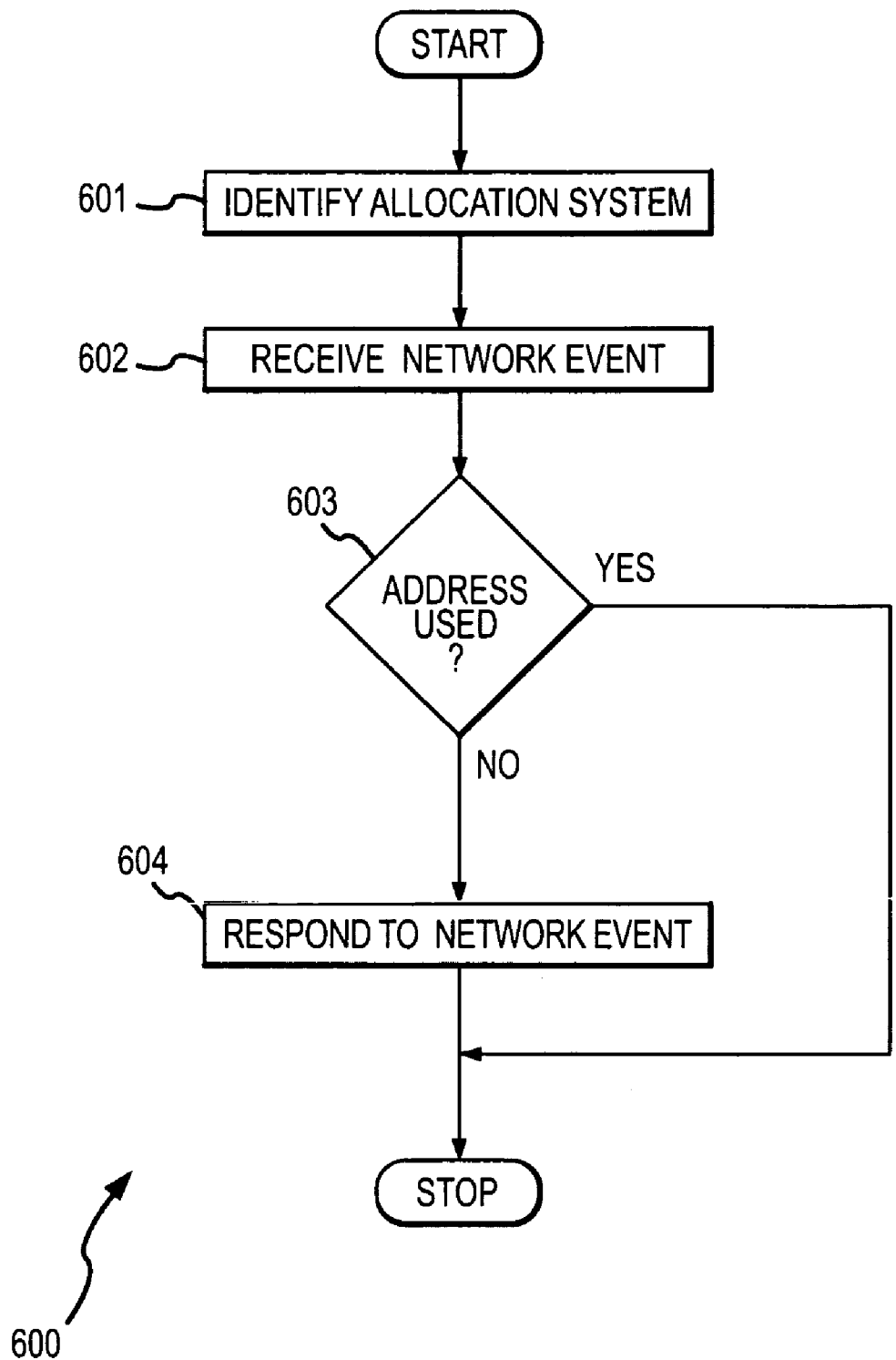
FIG. 6 is a flowchart of a method of managing network address utilization in an intrusion handling system according to an embodiment of the invention.
Figure 7:
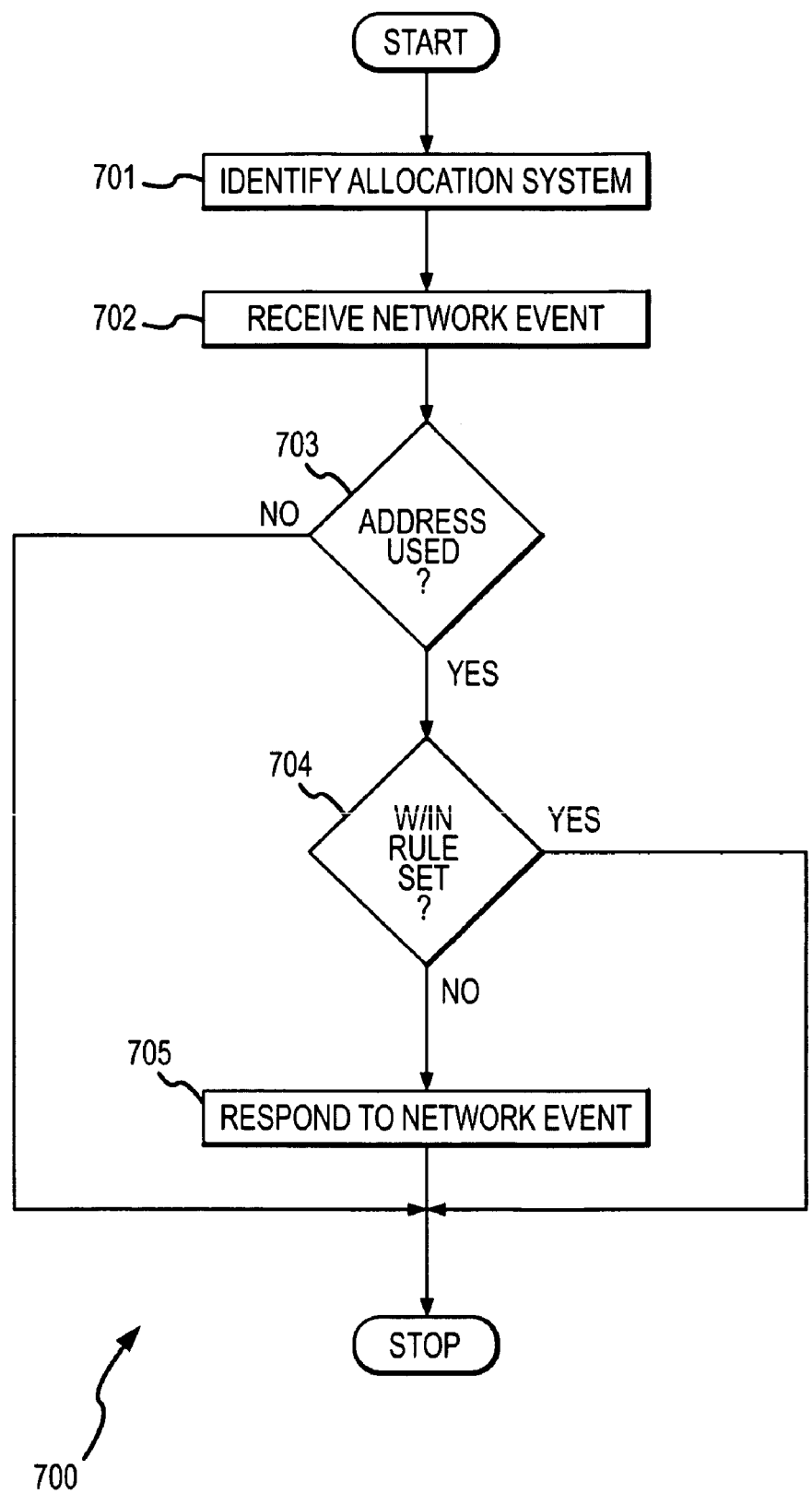
FIG. 7 is a flowchart of a method of managing network address utilization in an intrusion handling system according to an embodiment of the invention.

FIG. 5 is a flowchart 500 of a method of managing network address utilization in an intrusion handling system according to an embodiment of the invention. In the embodiments of FIGS. 5-7, the intrusion handling system 100 independently (i.e., passively) detects and employs unused network addresses, and the network address allocation system 140 can be unaware of the intrusion handling system 100.

In step 501, the intrusion handling system 100 identifies the network address allocation system 140. The intrusion handling system 100 may listen to network traffic (or signaling traffic) in order to perform the identification, or it may inquire directly using a discovery message in the address allocation protocol, such as DHCP on a TCP/IP network. In addition to the identification, the intrusion handling system 100 may determine the network address, the make and model, etc., of the network address allocation system 140, and can optionally determine capabilities of the network address allocation system 140. Furthermore, the intrusion handling system 100 can identify and catalog both used and unused network addresses and can determine other relevant information.

In step 502, the intrusion handling system 100 receives or detects a network event from the network address allocation system 140. The network event is directed at or includes a network address that is being requested by the network address allocation system 140 and that is being used by the intrusion handling system 100. The network event is used by the network address allocation system 140 in order to discover which network addresses are currently in use by trying to elicit a response from a using device. If no response is received by the network address allocation system 140, then the network address allocation system 140 decides that the network address is unused and can assign the network address to some requesting device. Conversely, if a device responds properly, the network address allocation system 140 determines that the network address is in use and will attempt to assign a different network address to the requesting device.

In one embodiment, the network event comprises a ping message. The ping message requests that the receiving device respond with some manner of echo or reply. However, it should be understood that other request messages or request protocols can be employed, and are within the scope of the description and claims.

In step 503, the intrusion handling system 100 determines whether to yield the requested network address. If the intrusion handling system 100 determines to not yield the network message, the method proceeds to step 504. Otherwise, the method branches around step 504 and no response is generated to the network event.

The determination can be based on one or more decision factors. The decision can be based solely on whether the intrusion handling system 100 has obtained the network address. In this case, the intrusion handling system 100 responds to the network event and retains the already obtained network address. Alternatively, the decision can be based solely on whether the intrusion handling system 100 is currently using the network address for intrusion handling, such as if the network address is currently trapping an intrusion attempt. In this case, the requested network address is yielded if the network address is not being used for intrusion handling. In another alternative, the decision can be based on whether the intrusion handling system 100 is currently using the network address for intrusion handling and an address yield rule set 113. The address yield rule set 113, in combination with use/non-use of the network address, determines whether the network address is yielded or retained. The address yield rule set 113 can take into account the percentage of use of network addresses, the severity of intrusion currently being trapped, etc.

Another factor can be the source of the network event. If the network event is generated by (or received from) an intruder, then the intrusion handling system 100 can be configured to not yield the network address. The determination of whether the network event is generated by an intruder can be obtained from previous intrusion handling operations. If the network event is not generated by the network address allocation system 140, then the intrusion handling system 100 can be configured to not yield the network address.

In step 504, the network address in question is not yielded and the intrusion handling system 100 therefore generates a response to the network event. The response indicates to the network address allocation system 140 that the requested network address is currently in use, and consequently the network address allocation system 140 will search for another network address for the requesting device.

FIG. 6 is a flowchart 600 of a method of managing network address utilization in an intrusion handling system according to an embodiment of the invention. In step 601, the intrusion handling system 100 identifies the network address allocation system 140, as previously discussed.

In step 602, the intrusion handling system 100 receives a network event from the network address allocation system 140, as previously discussed.

In step 603, the intrusion handling system 100 determines whether to yield the network address of the network event. The decision in the embodiment shown is based on whether the requested address is being used by the intrusion handling system 100 for intrusion handling (and also can be based on previously discussed factors). If the intrusion handling system 100 has already obtained the requested network address, the intrusion handling system 100 responds to the network event and retains the requested network address. If the intrusion handling system 100 determines to not yield the network address, the method proceeds to step 604; otherwise the method branches around step 604.

In step 604, the requested network address is not yielded and the intrusion handling system 100 therefore generates a response to the network event, as previously discussed.

FIG. 7 is a flowchart 700 of a method of managing network address utilization in an intrusion handling system according to an embodiment of the invention. In step 701, the intrusion handling system 100 identifies the network address allocation system 140, as previously discussed.

In step 702, the intrusion handling system 100 receives a network event from the network address allocation system 140, as previously discussed.

In step 703, the method determines whether the requested network address is currently being used by the intrusion handling system 100. If the intrusion handling system 100 has previously obtained the network address, then the method proceeds to step 704; otherwise the method branches around step 704 and step 705.

In step 704, the method determines whether the address yield rule set 113 indicates that the network address should be yielded (along with the previously discussed factors). As previously discussed, the address yield rule set 113 can take into account the percentage of use of network addresses, the type and severity of intrusion currently being trapped, traffic patterns and histories, etc. If the address yield rule set 113 indicates that the network address should be yielded, then the method bypasses step 705 and does not send a response to the network address allocation system 140. Under other types of address allocation services or protocols, the intrusion handling system 100 could alternately send a "yield" or "release" message, directly indicating to the address allocation system 140 that the address has become free for reassignment to another device.

In step 705, the network address in question is not yielded and the intrusion handling system 100 therefore generates a response to the network event, as previously discussed. The response indicates to the network address allocation system 140 that the requested network address is currently in use, and consequently the network address allocation system 140 will search for another network address for the requesting device.

Figure 8:
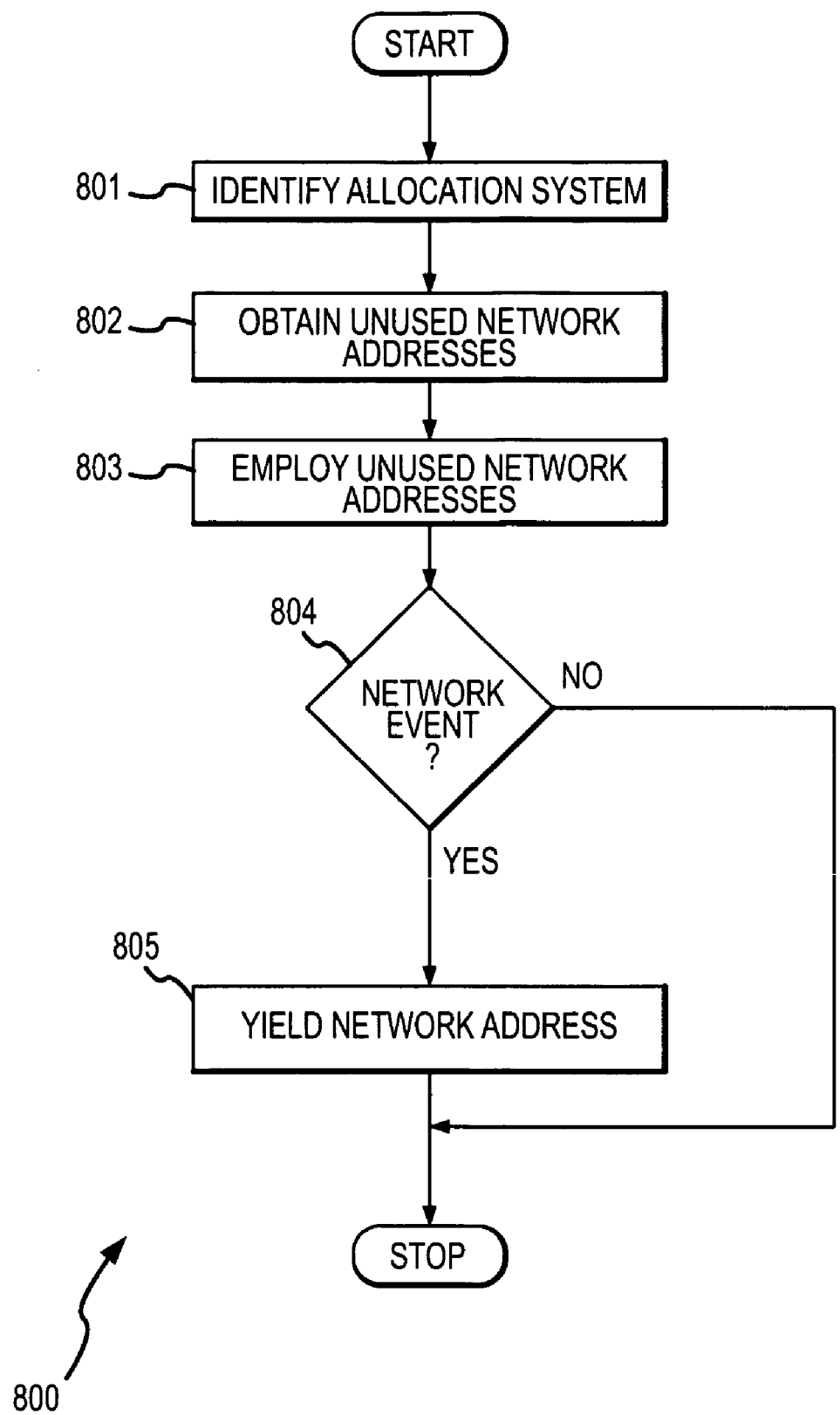
FIG. 8 is a flowchart of a method of managing network address utilization in an intrusion handling system according to an embodiment of the invention.
Figure 9:
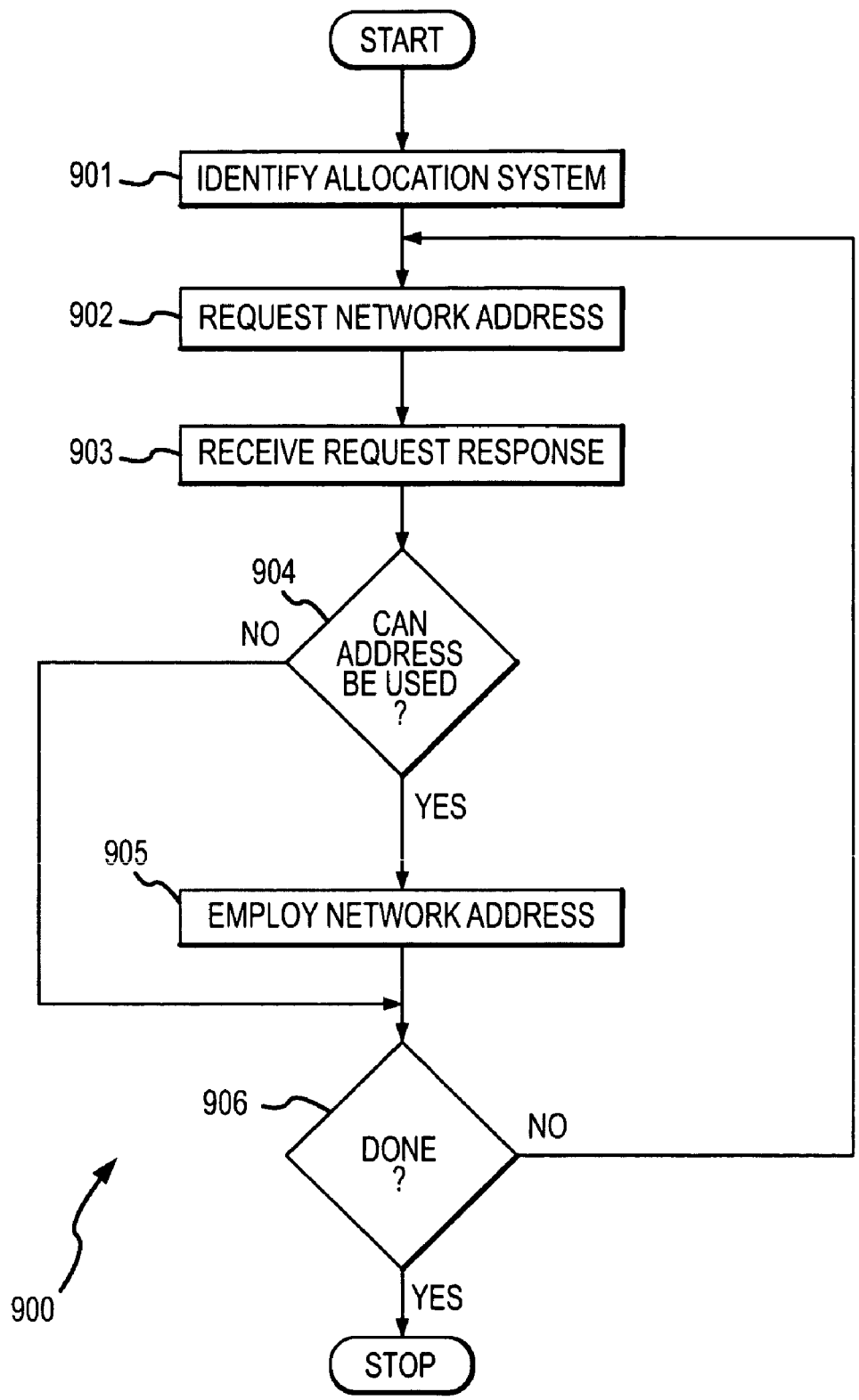
FIG. 9 is a flowchart of a method of managing network address utilization in an intrusion handling system according to an embodiment of the invention.

FIG. 8 is a flowchart 800 of a method of managing network address utilization in an intrusion handling system according to an embodiment of the invention. In the embodiments of FIGS. 8-9, the intrusion handling system 100 actively communicates with the network address allocation system 140 in order to obtain network addresses.

In step 801, the intrusion handling system 100 identifies the network address allocation system 140, as previously discussed.

In step 802, the intrusion handling system 100 obtains unused network addresses. The obtaining can be accomplished in various ways. In one embodiment, the intrusion handling system 100 queries the network address allocation system 140 regarding the availability of all network addresses. In one embodiment, the intrusion handling system 100 sends individual queries for each address of all network addresses. Where individual request messages are sent for each network address, the intrusion handling system 100 can start with a listing of all network addresses and remove network addresses that are indicated as being used by the network address allocation system 140 (or by the packet network 130). In one embodiment, the intrusion handling system 100 may request arbitrary addresses until it has obtain sufficient addresses according to its configuration rules, or until the network address allocation system 140 indicates that no further addresses are available for use by the intrusion handling system 100 at that time.

In step 803, the intrusion handling system 100 employs an otherwise unused network address. The unused network address can be employed for intrusion detecting, intrusion trapping, and intrusion tracing, for example. One or more of the known unused network addresses can be employed for intrusion handling, as needed and as dictated by the usage rule 114, as previously discussed.

In step 804, if a network event is generated by the network address allocation system 140, then the intrusion handling system 100 can determine whether to retain or yield the requested network address. The network event can request an acknowledgement message if the network address is being used by another device. The network event in one embodiment can be generated by the network address allocation system 140. Alternatively, the network event can be generated by (or received from) other sources, such as from a device on the packet network 100, from another network that is connected to or in communication with the packet network 100, etc. If the network event does not come from the network address allocation system 140, then in one embodiment the intrusion handling system 100 will not yield the address, and will respond to the message, indicating that the address is in use. Typically such a message might be the first step in a scanning operation such as that performed by a network worm. As previously discussed, the determination to yield an address can also be based on whether the requested network address is allocated to the intrusion handling system 100, whether the requested network address is being used for intrusion trapping by the intrusion handling system 100, whether the use of the requested network address and an address yield rule set dictate that the address be retained or yielded based on scanning or worm activity levels on the network, etc. If a network event is received, the method proceeds to step 805; otherwise, the method branches around it and does not send a response and does not yield the requested network address.

In step 805, the intrusion handling system 100 yields the requested network address. As previously discussed, the network address can be yielded by not responding to the network event.

FIG. 9 is a flowchart 900 of a method of managing network address utilization in an intrusion handling system according to an embodiment of the invention. In step 901, the intrusion handling system 100 identifies the network address allocation system 140, as previously discussed.

In step 902, the intrusion handling system 100 requests a network address from the network address allocation system 140.

In step 903, the intrusion handling system 100 receives a response from the network address allocation system 140 in response to the request of step 902.

In step 904, the intrusion handling system 100 determines whether the requested network address can be used. As previously discussed, the network address can be used if the reply (or lack of reply) from the network address allocation system 140 allows or permits the network address to be used by the intrusion handling system 100 (i.e., the network address allocation system 140 allocates the network address to the intrusion handling system 100). If the network address can be used, the method proceeds to step 905, otherwise it branches to step 906.

In step 905, the intrusion handling system 100 employs the requested network address. The intrusion handling system 100 therefore can use the network address for intrusion detecting, intrusion trapping, and intrusion tracing, for example.

The allocation of the network address to the intrusion handling system 100 can include a lease time, wherein the intrusion handling system 100 is allocated the network address for a lease time specified by the network address allocation system 140. In this circumstance, the intrusion handling system 100 will periodically re-request the network address in order to continue using the network address.

In step 906, the intrusion handling system 100 determines whether all address requesting operations are done. It should be understood that the steps of the flowchart 900 illustrate a procedure for obtaining a single network address. However, multiple network addresses can be iteratively obtained by the intrusion handling system 100. Therefore, if the intrusion handling system 100 is not done obtaining network addresses, the method then branches back to step 902.

A step not shown in the flowchart 900 is the substantially periodic refreshing of address allocations. Because the packet network 130 employs dynamic network address allocation, the intrusion handling system 100 can periodically perform an iterative refreshing operation. The refreshing operation can periodically re-request network addresses. The refreshing operation can periodically obtain additional network addresses and/or yield network addresses. Such a periodic refreshing operation will aid in yielding network addresses when in high demand and will aid in obtaining additional network addresses when the addresses are not in high demand.

FIG. 10 is a diagram of an integrated allocation/intrusion system 145 according to an embodiment of the invention. In this embodiment, the intrusion handling function is integrated into the network address allocation system 140. Therefore, the integrated allocation/intrusion system 145 includes the capabilities of both the network address allocation system 140 and the intrusion handling system 100. The integrated allocation/intrusion system 145 therefore can include a network address allocation routine 144, the intrusion handling routine 110, and the address utilization routine 111. The network address allocation routine 144 and the intrusion handling routine 110 can communicate with one or more packet networks through the network interface 148. In operation, the intrusion handling routine 110 is aware of network addresses that are available to be used for intrusion handling. The intrusion handling routine 110 can confiscate unused addresses and can yield up needed or requested network addresses, as previously discussed. This embodiment provides the fastest and most streamlined address utilization, as the intrusion handling routine 110 coordinates and cooperates with normal address usage in the packet network 130.

Figure 11:
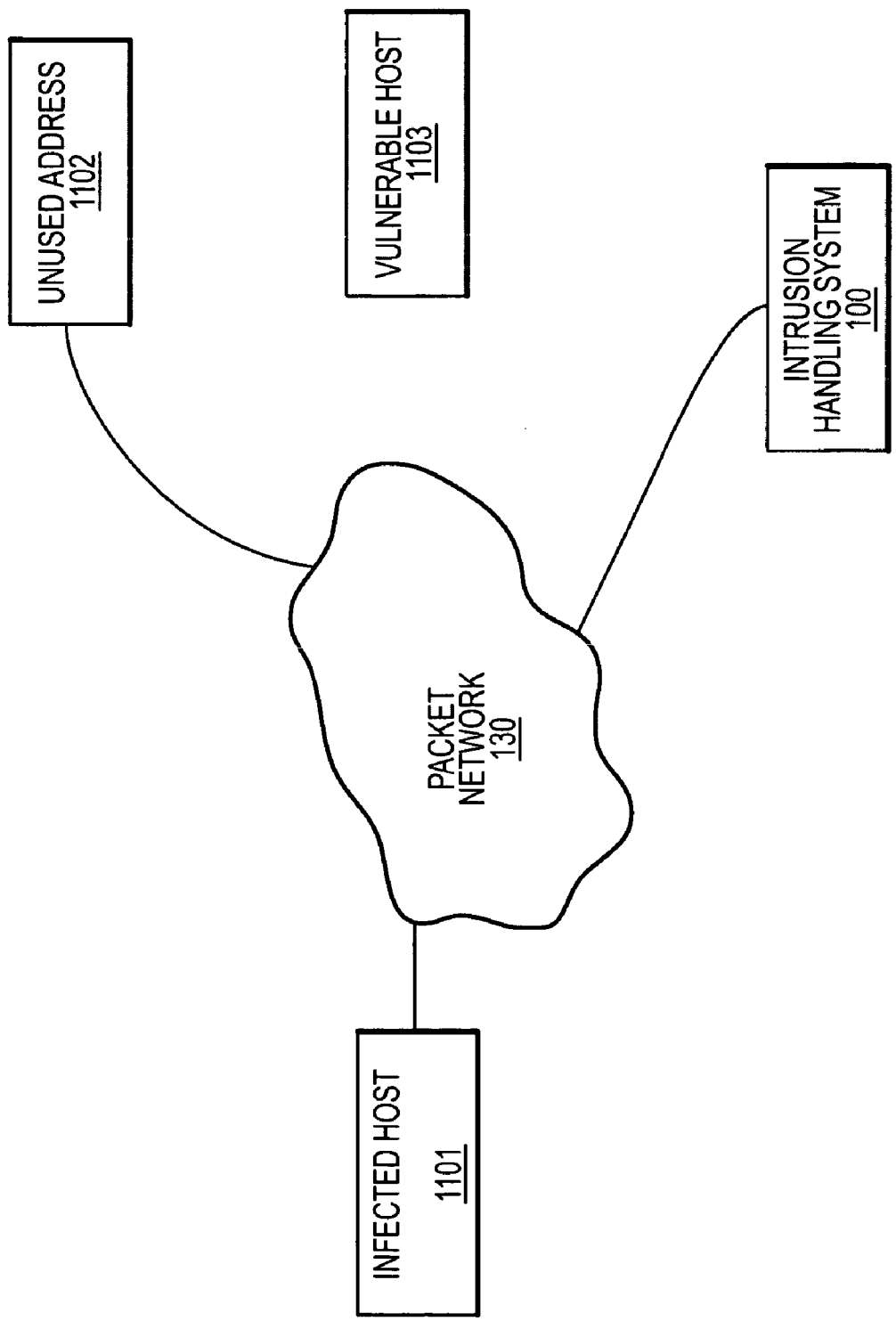
FIG. 11 illustrates several possible intrusion scenarios.

FIG. 11 illustrates several possible intrusion scenarios. First, the infected host 1101 can send a ping (or other scanning message) to the unused address 1102. The infected host will receive no reply, and will immediately move to scan subsequent addresses without delay. Without an intrusion handling system 100 on a network, this process takes place very quickly. Second, the infected host 1101 can send a ping to the vulnerable host 1103 at the time that the vulnerable host 1103 connects to the packet network 130 and obtains a network address. The vulnerable host 1103 will reply to the ping in order to communicate that the network address is in use and unavailable. Subsequently, having identified a device on the packet network 130 (i.e., the vulnerable host 1102), the infected host 1101 can attempt to infect the vulnerable host 1103. Third, the infected host 1101 can ping an address employed by the intrusion handling system 100. The intrusion handling system 100 can reply to the ping in order to attempt to trap the scan by the infected host 1101. Subsequently, the intrusion handling system 100 can respond to all messages sent by the infected host 1101 to that network address by replying with a message that traps the intrusion attempt, as previously discussed.

Figure 12:
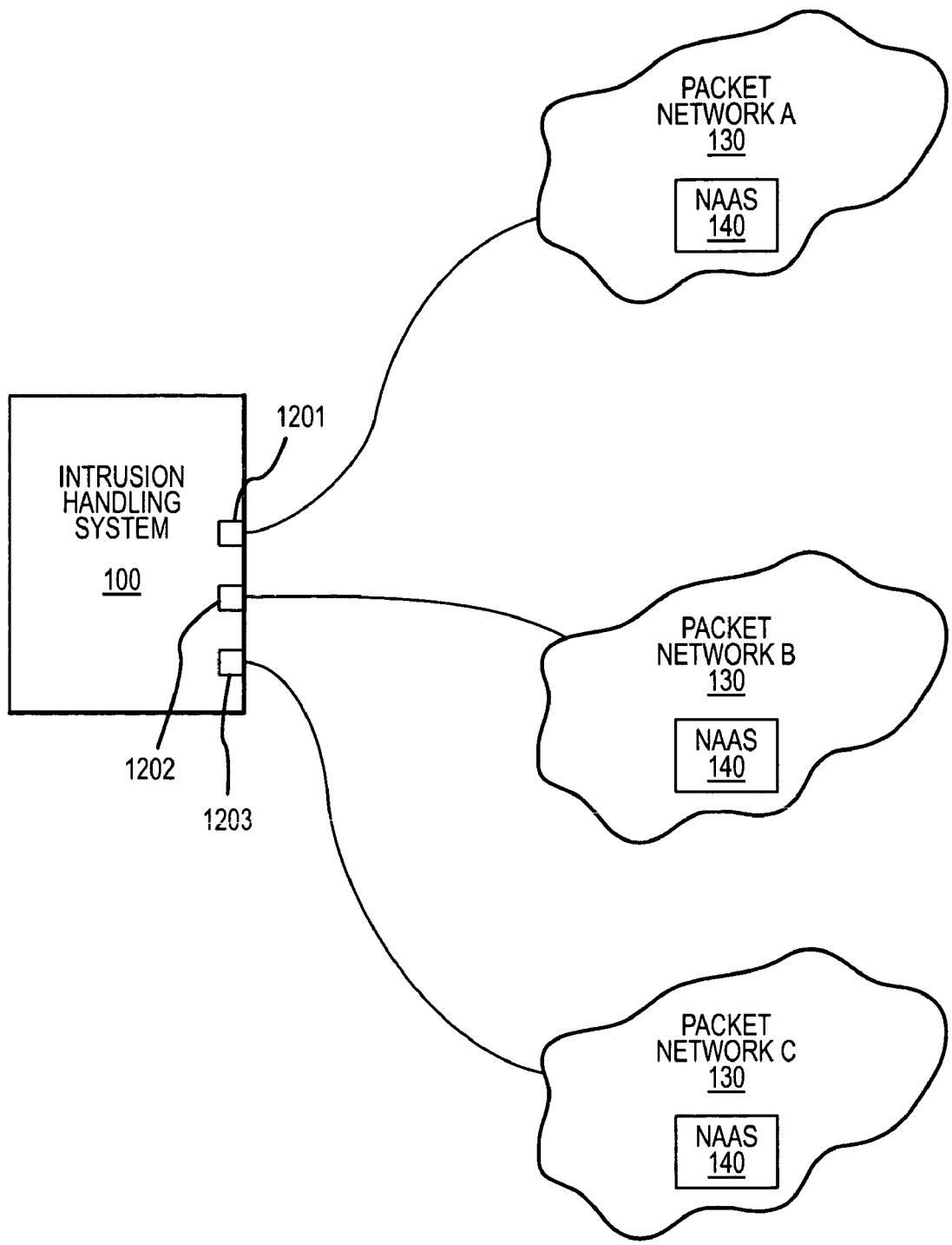
FIG. 12 shows an intrusion handling system that includes multiple ports, wherein the intrusion handling system is used for intrusion handling in multiple packet networks A, B, and C.

FIG. 12 shows an intrusion handling system 100 that includes multiple network interfaces 1201, 1202, and 1203, wherein the intrusion handling system 100 is used for intrusion handling in multiple packet networks A, B, and C. Such a situation will be advantageous in an institution that includes multiple packet networks. For example, the institution may have multiple LANs and/or multiple, geographically remote facilities. One intrusion handling system 100 can perform intrusion handling duties for the multiple packet networks, and can coordinate intrusion detecting, trapping, and tracing processes over all of the multiple networks. This can be especially advantageous when a device on one packet network within the institution is being used as an automated scanning device that scans/accesses computer devices on the other packet networks.

As shown in the figure, each packet network 130 can include its own network address allocation system 140. Alternatively, multiple networks can use a single network address allocation system 140. For example, the intrusion handling system 100 can comprise the integrated allocation/intrusion system 145 of FIG. 10, which may further comprise such a combined system running with other services on a network router, switch, firewall, IDS (intrusion detection system), or multi-purpose network services appliance.

It should be understood that the packet networks A, B, and C can comprise the same type of network or can comprise different networks. For example, packet network A could comprise a Local Area Network, such as an Ethernet™ network, packet network B could comprise a wireless network, and packet network C could comprise a network sub-portion, such as a Virtual Private Network (VPN).

It should be understood that the packet networks A, B, and C can use any communication protocol, such as TCP/IP (i.e., the Transmission Control Protocol and/or the Internet Protocol IPX/SPX, (Internetwork Packet Exchange/Sequenced Packet Exchange), GPRS (General Packet Radio Service), etc. In addition, the packet networks can use varying protocol versions, such as TCP version 4 (TCPv4), TCPv6, etc. Moreover, each packet network can use a different protocol or use multiple protocols. The communication protocol may be supported by any lower level carrier protocols or networks, including wired, cable, fiber optics or wireless networks running a variety of carrier protocols such as Ethernet, frame relay, SNA, FireWire, or CDMA, for example.

The intrusion handling system and method of managing network address allocation in the intrusion handling system according the invention can be implemented according to any of the embodiments in order to obtain several advantages, if desired. The invention provides improved and efficient intrusion detection and trapping. The invention can utilize most or all of the unused network addresses. The invention can utilize network addresses without interfering with network communications. The invention adapts to and dynamically accommodates network address requirements as systems are added to and as systems leave the network. The invention quickly and transparently yields needed network addresses. The invention is capable of autonomously obtaining network addresses as they become available. The invention communicates with a network address allocation system.

What is claimed is:

1. An intrusion handling system for a packet network, comprising:
    a communication interface configured to receive or detect a network event that is directed to a network address; and
    a processing system coupled to the communication interface and configured to receive the network event from the communication interface, determine whether to yield the network address, respond to the network event in order to retain the network address, and not respond to the network event in order to yield the network address.

2. The intrusion handling system of claim 1, with the processing system being further configured to determine whether the network event is generated by an intruder and wherein the network address is not yielded if the network event is generated by the intruder.

3. The intrusion handling system of claim 1, with the processing system being further configured to determine whether the network event is generated by a network address allocation system and wherein the network address is not yielded if the network event is not generated by the network address allocation system.

4. The intrusion handling system of claim 1, with the determining further comprising determining whether the network address is being used by the intrusion handling system for intrusion handling.

5. The intrusion handling system of claim 1, with the determining further comprising determining whether the network address is being used by the intrusion handling system for trapping an intrusion occurrence.

6. The intrusion handling system of claim 1, with the determining further comprising determining whether the network address is trapping an intrusion occurrence and determining whether an address yield rule set indicates that the network address should be yielded.

7. The intrusion handling system of claim 1, with the intrusion handling system comprising a stand-alone network device.

8. The intrusion handling system of claim 1, with the intrusion handling system being integrated into a network component.

9. The intrusion handling system of claim 1, with the intrusion handling system being integrated into a network address allocation system.

10. The intrusion handling system of claim 1, with the network event comprising an address request message.

11. The intrusion handling system of claim 1, with the network event comprising an address signal.

12. An intrusion handling system for a packet network, comprising:
    a Dynamic Host Configuration Protocol (DHCP) server;
    a communication interface in the DHCP server, with the communication interface configured to receive or detect a network event that is directed to a network address; and
    a processing system in the DHCP server, with the processing system configured to receive the network event from the communication interface, determine whether the network address is being used by the intrusion handling system for intrusion handling, yield the network address to the network address allocation routine if the network address is not being used by the intrusion handling system for intrusion handling, and retain the network address if the address is being used by the intrusion handling system for intrusion handling.

13. The intrusion handling system of claim 12, with the processing system being further configured to determine whether the network event is generated by an intruder and wherein the network address is not yielded if the network event is generated by the intruder.

14. The intrusion handling system of claim 12, with the determining further comprising determining whether the network address is being used by the intrusion handling system for trapping an intrusion occurrence.

15. The intrusion handling system of claim 12, with the determining further comprising determining whether the network address is trapping an intrusion occurrence and determining whether an address yield rule set indicates that the network address should be yielded.

16. The intrusion handling system of claim 12, with the network event comprising an address request message.

17. The intrusion handling system of claim 12, with the network event comprising an address signal.

18. An intrusion handling system for a packet network, comprising:
    a communication interface configured to receive or detect a network event that is directed to a network address; and
    a processing system coupled to the communication interface and configured to obtain a listing of one or more unused network addresses, employ at least a portion of the listing of one or more unused network addresses for intrusion handling operations in the intrusion handling system, and dynamically yield the network address from the intrusion handling system in response to the network event.

19. The intrusion handling system of claim 18, with the employing comprising the intrusion handling system iteratively obtaining a plurality of available network addresses.

20. The intrusion handling system of claim 18, further comprising obtaining additional network addresses when available.

21. The intrusion handling system of claim 18, wherein a network address is periodically re-requested by the intrusion handling system.

22. The intrusion handling system of claim 18, with the processing system being further configured to determine whether the network event is generated by an intruder and wherein the network address is not yielded if the network event is generated by the intruder.

23. The intrusion handling system of claim 18, with the processing system being further configured to determine whether the network event is generated by a network address allocation system and wherein the network address is not yielded if the network event is not generated by the network address allocation system.

24. The intrusion handling system of claim 18, with the employing comprising the intrusion handling system using a network address for intrusion handling without requesting the network address.

25. The intrusion handling system of claim 18, with the employing comprising the intrusion handling system using a network address for intrusion handling after requesting the network address.

26. The intrusion handling system of claim 18, with the employing comprising the intrusion handling system using a network address for intrusion handling after requesting the network address from a network address allocation system.

27. The intrusion handling system of claim 18, wherein a network address is requested from a network address allocation system by the intrusion handling system and wherein the requested network address is allocated to the intrusion handling system for a predetermined time period by the network address allocation system.

28. The intrusion handling system of claim 18, with the obtaining further comprising identifying a network address allocation system.

29. The intrusion handling system of claim 18, with the obtaining comprising:
listening to network traffic; and
removing used network addresses from a listing of all network addresses in order to form the listing of one or more unused network addresses.

30. The intrusion handling system of claim 18, with the obtaining comprising:
obtaining a listing of all network addresses;
listening to network traffic; and
removing used network addresses included in the network traffic from a listing of all network addresses in order to form the listing of one or more unused network addresses.

31. The intrusion handling system of claim 18, with the obtaining comprising querying the packet network for a particular network address and adding the particular network address to the listing of one or more unused network addresses if the particular network address is unused.

32. The intrusion handling system of claim 18, with the obtaining comprising querying a network address allocation system for a particular network address and adding the particular network address to the listing of one or more unused network addresses if the particular network address is unused.

33. The intrusion handling system of claim 18, with the obtaining comprising querying a network address allocation system for a particular network address and adding the particular network address to the listing of one or more unused network addresses if the network address allocation system does not respond to the query.

34. The intrusion handling system of claim 18, with the obtaining comprising:
requesting a network address of the one or more unused network addresses;
receiving a request response;
employing the network address in the intrusion handling system if the request response signals that the network address can be used by the intrusion handling system; and
not employing the network address in the intrusion handling system if the request response signals that the network address cannot be used by the intrusion handling system.

35. The intrusion handling system of claim 34, with the requesting comprising requesting the network address from a network address allocation system.

36. The intrusion handling system of claim 18, with the processing system being further configured to determine whether the network address is being used by the intrusion handling system for trapping an intrusion occurrence before yielding the network address.

37. The intrusion handling system of claim 18, with the processing system being further configured to determine whether the network address is being used by the intrusion handling system for trapping an intrusion occurrence and to determine whether the address yield rule set indicates that the network address should be yielded.

38. The intrusion handling system of claim 18, with the intrusion handling system comprising a stand-alone network device.

39. The intrusion handling system of claim 18, with the intrusion handling system being integrated into a network component.

40. The intrusion handling system of claim 18, with the intrusion handling system being integrated into a network address allocation system.

41. The intrusion handling system of claim 18, with the network event comprising an address request message.

42. The intrusion handling system of claim 18, with the network event comprising an address signal.

43. A method of managing network address utilization in an intrusion handling system for a packet network, the method comprising:
receiving or detecting a network event that is directed to a network address;
determining whether to yield the network address;
responding to the network event in order to retain the network address; and
not responding to the network event in order to yield the network address.

44. The method of claim 43, with the determining further comprising determining whether the network event is generated by an intruder and wherein the network address is not yielded if the network event is generated by the intruder.

45. The method of claim 43, with the determining further comprising determining whether the network event is generated by a network address allocation system and wherein the network address is not yielded if the network event is not generated by the network address allocation system.

46. The method of claim 43, with the determining further comprising determining whether the network address is being used by the intrusion handling system for intrusion handling.

47. The method of claim 43, with the determining further comprising determining whether the network address is being used by the intrusion handling system for trapping an intrusion occurrence.

48. The method of claim 43, with the determining further comprising determining whether the network address is being used by the intrusion handling system for trapping an intrusion occurrence and determining whether the address yield rule set indicates that the network address should be yielded.

49. The method of claim 43, with the network event being generated by a network address allocation system.

50. The method of claim 43, with the network event comprising an address request message.

51. The method of claim 43, with the network event comprising an address signal.

52. A method of managing network address utilization in an intrusion handling system for a packet network, the method comprising:
receiving or detecting a network event that is directed to a network address;

determining whether the network address is being used by the intrusion handling system for intrusion handling;

yielding the network address if the network address is not being used by the intrusion handling system for intrusion handling; and retaining the network address if the address is being used by the intrusion handling system for intrusion handling.

53. The method of claim 52, with the yielding further comprising determining whether the network event is generated by an intruder and wherein the network address is not yielded if the network event is generated by the intruder.

54. The method of claim 52, with the yielding further comprising determining whether the network event is generated by a network address allocation system and wherein the network address is not yielded if the network event is not generated by the network address allocation system.

55. The method of claim 52, with the determining further comprising determining whether the network address is being used by the intrusion handling system for trapping an intrusion occurrence and determining whether the address yield rule set indicates that the network address should be yielded.

56. The method of claim 52, with the network event being generated by a network address allocation system.

57. The method of claim 52, with the network event comprising an address request message.

58. The method of claim 52, with the network event comprising an address signal.

59. A method of managing network address utilization in an intrusion handling system for a packet network, the method comprising:

receiving or detecting a network event that is directed to a network address;

determining whether the network address is being used by the intrusion handling system for trapping an intrusion occurrence;

not responding to the network event if the network address is not being used by the intrusion handling system for trapping an intrusion occurrence or if the address yield rule set indicates that the network address should be yielded; and responding to the network event if the network address is being used by the intrusion handling system for trapping an intrusion occurrence and if the address yield rule set indicates that the network address should not be yielded.

60. The method of claim 59, with the responding further comprising determining whether the network event is generated by an intruder and wherein the intrusion handling system responds and the network address is not yielded if the network event is generated by the intruder.

61. The method of claim 59, with the responding further comprising determining whether the network event is generated by a network address allocation system and wherein the intrusion handling system responds and the network address is not yielded if the network event is not generated by the network address allocation system.

62. The method of claim 59, with the network event being generated by a network address allocation system.

63. The method of claim 59, with the network event comprising an address request message.

64. The method of claim 59, with the network event comprising an address signal.

65. A method of managing network address utilization in an intrusion handling system for a packet network, the method comprising:

obtaining a listing of one or more unused network addresses;

employing at least a portion of the listing of one or more unused network addresses for intrusion handling operations in the intrusion handling system; and dynamically yielding a requested network address from the intrusion handling system when a network event that is directed to the requested network address is received or detected.

66. The method of claim 65, with the employing comprising the intrusion handling system iteratively obtaining a plurality of available network addresses.

67. The method of claim 65, further comprising obtaining additional network addresses when available.

68. The method of claim 65, wherein a network address is periodically re-requested by the intrusion handling system.

69. The method of claim 65, with the network event being generated by a network address allocation system.

70. The method of claim 65, with the employing comprising the intrusion handling system using a network address for intrusion handling without requesting the network address.

71. The method of claim 65, with the employing comprising the intrusion handling system using a network address for intrusion handling after requesting the network address.

72. The method of claim 65, with the employing comprising the intrusion handling system using a network address for intrusion handling after requesting the network address from a network address allocation system.

73. The method of claim 65, wherein a network address is requested from a network address allocation system by the intrusion handling system and wherein the requested network address is allocated to the intrusion handling system for a predetermined time period by the network address allocation system.

74. The method of claim 65, further comprising attempting to detect a network address allocation system before the obtaining.

75. The method of claim 65, with the obtaining comprising:

listening to network traffic; and removing used network addresses from a listing of all network addresses in order to form the listing of one or more unused network addresses.

76. The method of claim 65, with the obtaining comprising:

obtaining a listing of all network addresses;

listening to network traffic; and removing used network addresses included in the network traffic from a listing of all network addresses in order to form the listing of one or more unused network addresses.

77. The method of claim 65, with the obtaining comprising querying the packet network for a particular network address and adding the particular network address to the listing of one or more unused network addresses if the particular network address is unused.

78. The method of claim 65, with the obtaining comprising querying a network address allocation system for a particular network address and adding the particular network address to the listing of one or more unused network addresses if the particular network address is unused.

79. The method of claim 65, with the obtaining comprising querying a network address allocation system for a particular network address and adding the particular network address to the listing of one or more unused network addresses if the network address allocation system does not respond to the query.

80. The method of claim 65, with the obtaining comprising:
requesting a network address of the one or more unused network addresses;
receiving a request response;
employing the network address in the intrusion handling system if the request response signals that the network address can be used by the intrusion handling system; and
not employing the network address in the intrusion handling system if the request response signals that the network address cannot be used by the intrusion handling system.

81. The method of claim 80, with the requesting comprising requesting the network address from a network address allocation system.

82. The method of claim 65, with the processing system being further configured to determine whether the network address is being used by the intrusion handling system for trapping an intrusion occurrence before yielding the network address.

83. The method of claim 65, with the processing system being further configured to determine whether the network address is being used by the intrusion handling system for trapping an intrusion occurrence and to determine whether the address yield rule set indicates that the network address should be yielded.

84. The method of claim 65, with the network event comprising an address request message.

85. The method of claim 65, with the network event comprising an address signal.

86. A method of managing network address utilization in an intrusion handling system for a packet network, the method comprising:
requesting a network address of the one or more unused network addresses;
receiving a request response;
employing the network address in the intrusion handling system if the request response signals that the network address can be used by the intrusion handling system; and
not employing the network address in the intrusion handling system if the request response signals that the network address cannot be used by the intrusion handling system.

87. The method of claim 86, further comprising the intrusion handling system iteratively obtaining a plurality of available network addresses.

88. The method of claim 86, further comprising obtaining additional network addresses when available.

89. The method of claim 86, wherein the network address is periodically re-requested by the intrusion handling system.

90. The method of claim 86, wherein the requested network address is allocated to the intrusion handling system for a predetermined time period.

91. The method of claim 86, wherein the requested network address is allocated to the intrusion handling system for a predetermined time period by a network address allocation system.

92. The method of claim 86, further comprising attempting to detect a network address allocation system before the requesting.

93. The method of claim 86, further comprising:
listening to network traffic; and
removing used network addresses from a listing of all network addresses in order to form the listing of one or more unused network addresses.

94. The method of claim 86, further comprising:
obtaining a listing of all network addresses;
listening to network traffic; and
removing used network addresses included in the network traffic from a listing of all network addresses in order to form the listing of one or more unused network addresses.

95. The method of claim 86, further comprising querying the packet network for a particular network address and adding the particular network address to the listing of one or more unused network addresses if the particular network address is unused.

96. The method of claim 86, further comprising querying a network address allocation system for a particular network address and adding the particular network address to the listing of one or more unused network addresses if the particular network address is unused.

97. The method of claim 86, further comprising querying a network address allocation system for a particular network address and adding the particular network address to the listing of one or more unused network addresses if the network address allocation system does not respond to the query.

98. The method of claim 86, further comprising:
receiving or detecting a network event that is directed to a particular network address; and
dynamically yielding the particular network address from the intrusion handling system.

99. The method of claim 86, further comprising:
receiving or detecting a network event that is directed to a particular network address;
determining whether the particular network address is being used by the intrusion handling system for trapping an intrusion occurrence; and
dynamically yielding the particular network address from the intrusion handling system if the particular network address is not being used by the intrusion handling system for trapping an intrusion occurrence.

100. The method of claim 86, further comprising:
receiving or detecting a network event that is directed to a particular network address;
determining whether the particular network address is being used by the intrusion handling system for trapping an intrusion occurrence;
determining whether the address yield rule set indicates that the particular network address should be yielded; and
dynamically yielding the particular network address from the intrusion handling system if the particular network address is not being used by the intrusion handling system for trapping an intrusion occurrence and if the address yield set indicates that the particular network address should be yielded.

* * * * *